(12) United States Patent
Nangeroni et al.

(10) Patent No.: US 10,553,113 B2
(45) Date of Patent: Feb. 4, 2020

(54) METHOD AND SYSTEM FOR VEHICLE LOCATION

(71) Applicant: Skip Transport, Inc., San Francisco, CA (US)

(72) Inventors: Paul Nangeroni, San Francisco, CA (US); Shalin Mantri, San Francisco, CA (US); Scott Bezek, San Francisco, CA (US)

(73) Assignee: Skip Transport, Inc., San Francisco, CA (US)

( * ) Notice: Subject to any disclaimer, the term of this patent is extended or adjusted under 35 U.S.C. 154(b) by 0 days.

(21) Appl. No.: 16/444,422

(22) Filed: Jun. 18, 2019

(65) Prior Publication Data

US 2019/0385452 A1 Dec. 19, 2019

Related U.S. Application Data

(60) Provisional application No. 62/686,175, filed on Jun. 18, 2018.

(51) Int. Cl.
| | | |
|---|---|---|
| *G08G 1/123* | (2006.01) | |
| *G01S 5/00* | (2006.01) | |
| *G07C 5/00* | (2006.01) | |

(52) U.S. Cl.
CPC ............ *G08G 1/123* (2013.01); *G01S 5/0072* (2013.01); *G07C 5/008* (2013.01)

(58) Field of Classification Search
CPC ........ G08G 1/123; G01S 5/0072; G07C 5/008
USPC .......................................................... 340/989
See application file for complete search history.

(56) References Cited

U.S. PATENT DOCUMENTS

| | | | |
|---|---|---|---|
| 5,761,326 A | 6/1998 | Brady et al. | |
| 5,930,726 A * | 7/1999 | Fujita | H04W 16/26 455/20 |
| 5,961,571 A | 10/1999 | Gorr et al. | |
| 7,847,709 B2 | 12/2010 | McCall et al. | |
| 8,358,342 B2 | 1/2013 | Park | |
| 9,528,852 B2 * | 12/2016 | Eronen | G10L 25/54 |
| 9,738,255 B2 | 8/2017 | Keating et al. | |
| 9,854,395 B2 | 12/2017 | Lee et al. | |
| 2006/0285754 A1 | 12/2006 | Steinberg et al. | |
| 2007/0205918 A1 | 9/2007 | Riesco et al. | |
| 2009/0291641 A1 * | 11/2009 | Sato | H04M 1/72522 455/67.11 |
| 2012/0252495 A1 * | 10/2012 | Moeglein | G01S 19/26 455/456.3 |
| 2014/0037142 A1 | 2/2014 | Bhanu et al. | |
| 2014/0187270 A1 * | 7/2014 | Zinin | H04W 4/043 455/456.3 |
| 2017/0147959 A1 | 5/2017 | Sweeney et al. | |
| 2017/0365030 A1 | 12/2017 | Shoham et al. | |
| 2018/0032585 A1 * | 2/2018 | Kadiyala | H04M 1/274583 |

OTHER PUBLICATIONS

International Search Report and Written Opinion for PCT Application No. PCT/US2019/037668 dated Sep. 5, 2019.

* cited by examiner

*Primary Examiner* — Nay Tun
(74) *Attorney, Agent, or Firm* — Jeffrey Schox; Diana Lin

(57) ABSTRACT

A method for vehicle location preferably includes determining vehicle information, and can optionally include facilitating location of the vehicle. In variants, the method can guide the user to the general vehicle vicinity by presenting the user with an imprecise vehicle location, and locally guide the user to the vehicle using vehicle information.

20 Claims, 16 Drawing Sheets

METHOD AND SYSTEM FOR VEHICLE LOCATION

CROSS-REFERENCE TO RELATED APPLICATIONS

This application claims the benefit of U.S. Provisional Application No. 62/686,175 filed 18 Jun. 2018, which is incorporated in its entirety by this reference.

TECHNICAL FIELD

This invention relates generally to the vehicle operation field, and more specifically to a new and useful method and system for vehicle location.

BACKGROUND

The inventors have discovered that no satisfactory refined vehicle location method currently exists.

Conventional solutions provide imprecise vehicle locations, which makes vehicles difficult to find, especially for users that did not initially park the vehicle. Given that the GPS is accurate within meters in the best cases (the problem is further aggravated in areas with urban canyons), it's possible that the vehicle's location is further from that reported, or that the vehicle is nearby, but unfindable because the vehicle is obscured.

This problem is further aggravated when the vehicle is light or small (e.g., a scooter or a bicycle), since the light/small vehicle can be easily occluded behind a large object, such as a dumpster or a truck, can be left in a hard-to-access location, such as behind a fence, or even moved indoors (e.g., be stolen).

The difficulty of locating vehicles oftentimes results in poor user experience, which can reduce user retention and/or reduce personnel productivity (e.g., ranger productivity).

Furthermore, conventional solutions can't solve this problem with an on-vehicle solution, because their vehicles oftentimes lack sufficient sensors and on-board processing power. Additionally, when images or other environmental information is provided to locate the vehicle, sensitive data issues arise (e.g., images can include sensitive content, PII, etc.).

Conventional solutions also do not provide an interface for a vehicle to communicate with a management entity (e.g., ranger, management service, etc.) for vehicle recovery.

Thus, there is a need in the vehicle field to create a new and useful vehicle location system and method. This invention provides such new and useful vehicle location system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
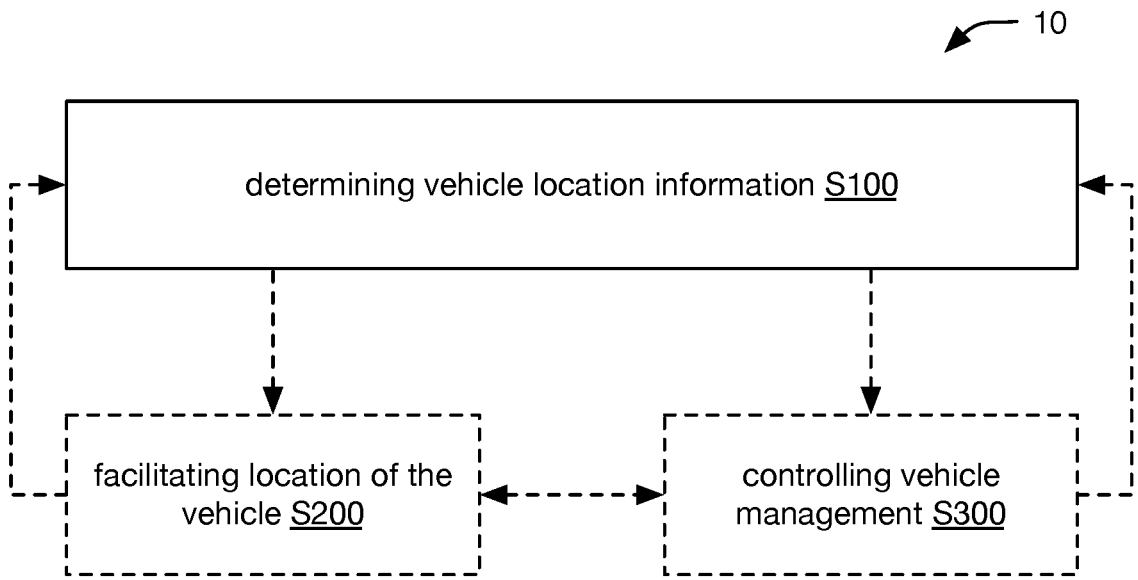
FIGS. 1A-1D are a schematic representations of an embodiment of the method, an example of the embodiment, a generic embodiment, and a second example of the embodiment of the method respectively.
Figure 1B:
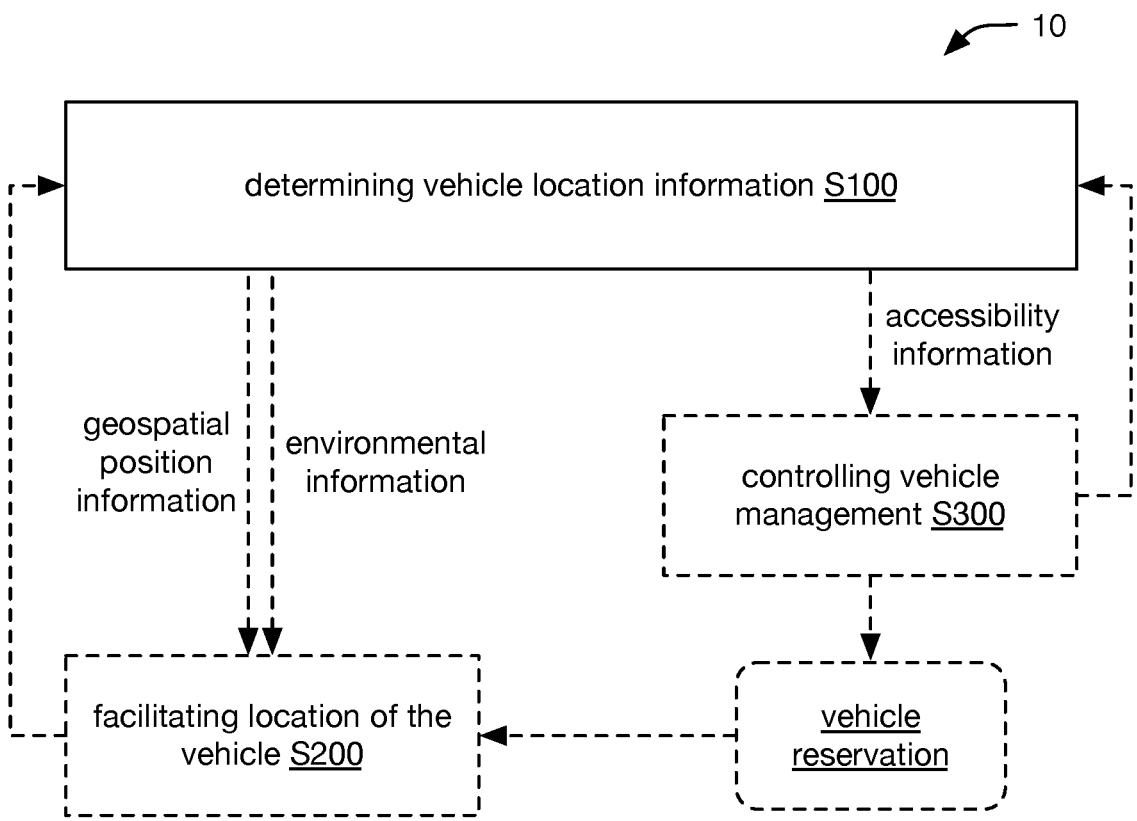
Figure 1C:
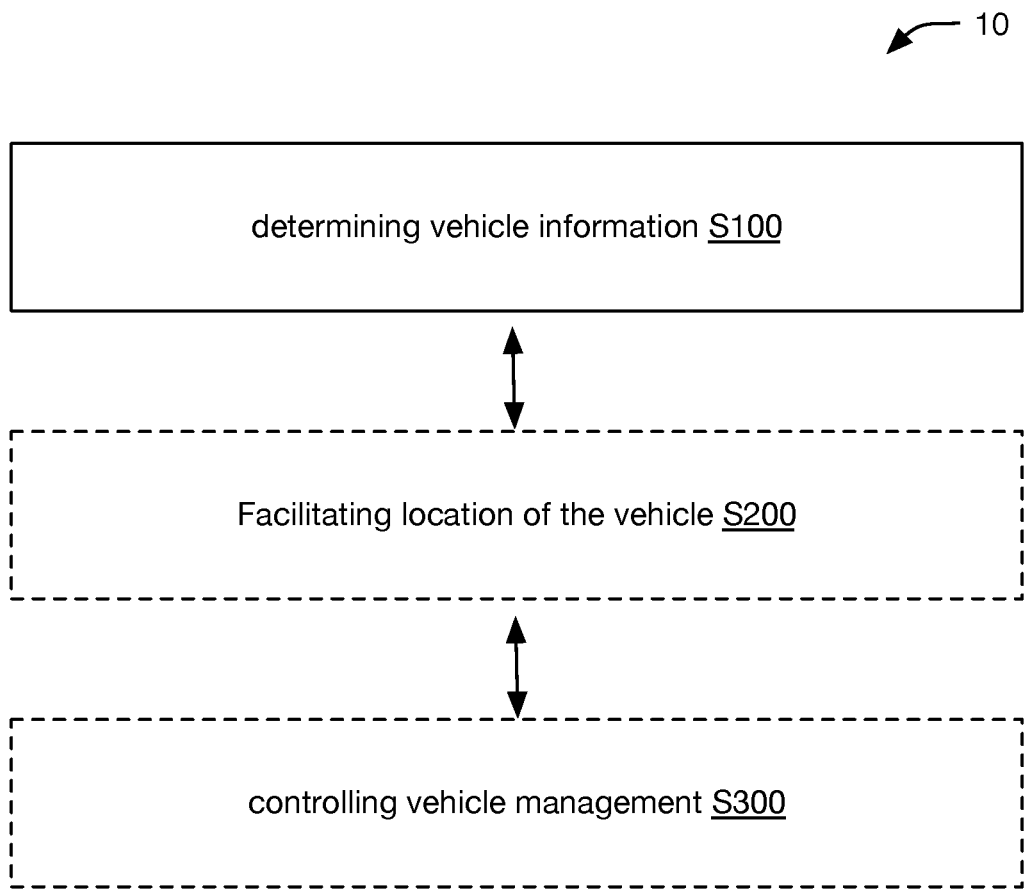
Figure 1D:
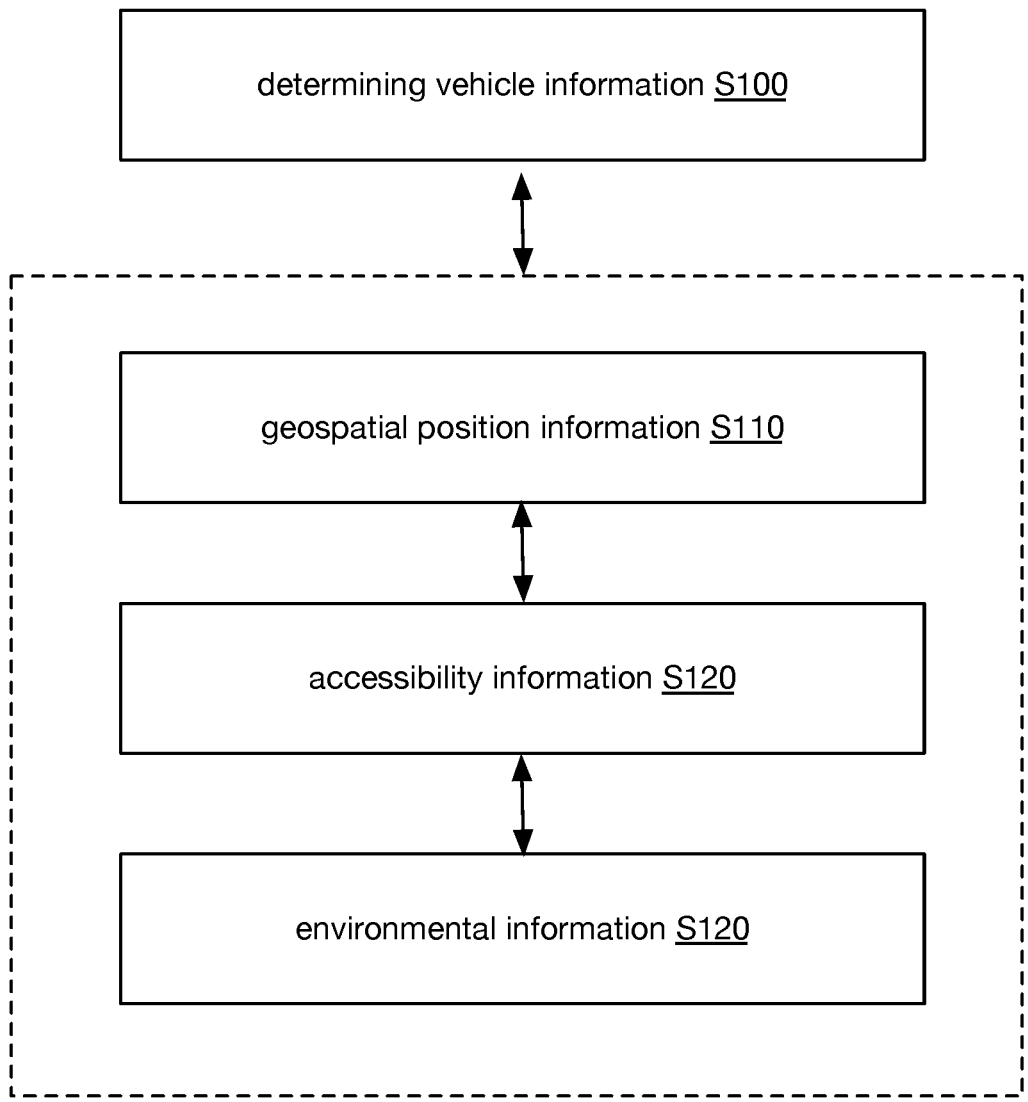
Figure 2A:
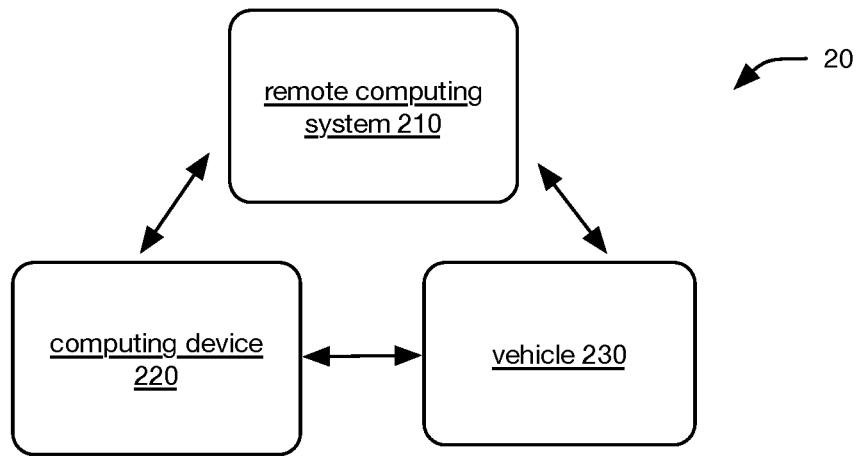
FIGS. 2A-2B are a schematic representation of an embodiment of the system and an example of the embodiment, respectively.
Figure 2B:
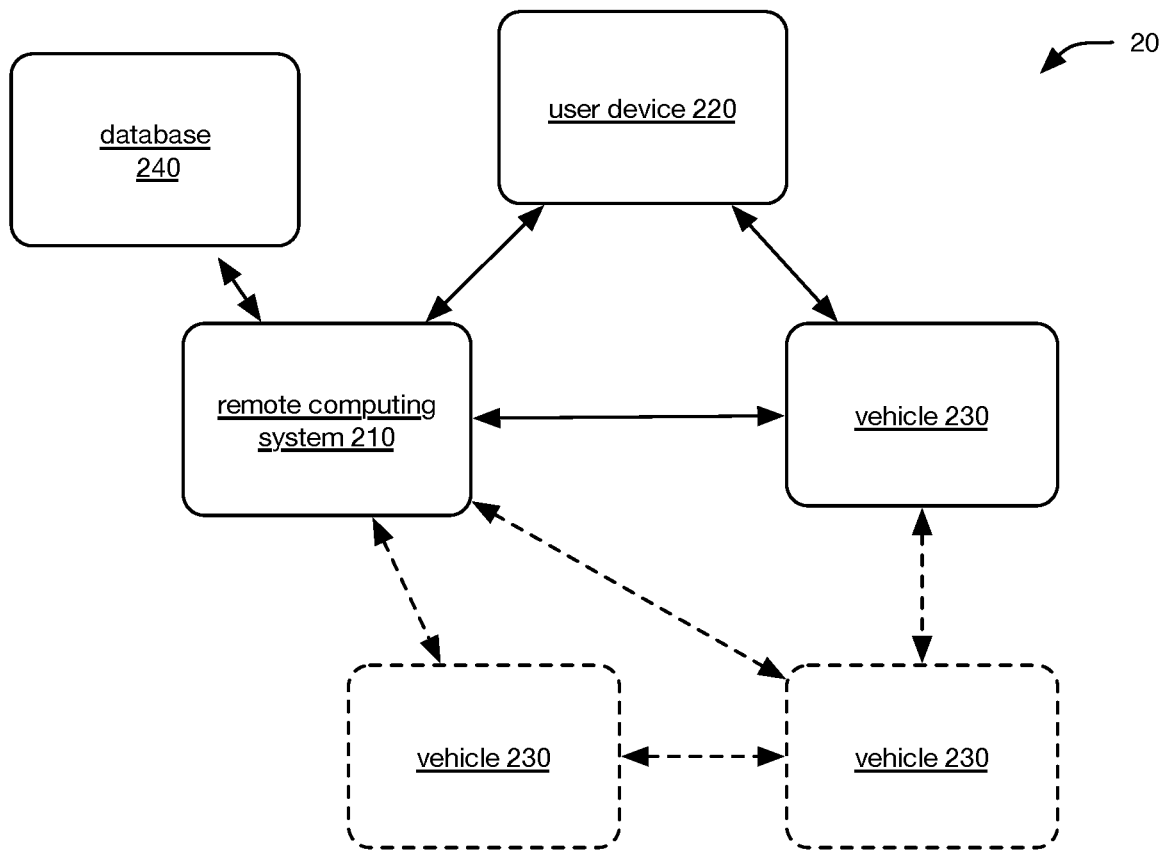

A method 10 for vehicle location preferably includes determining vehicle information S100, and can additionally or alternatively include facilitating location of the vehicle S200, controlling vehicle management S300, and/or any other suitable elements (e.g., as shown in FIGS. 1A-1C). A system 20 for vehicle location preferably includes one or more vehicles and one or more computing devices (e.g., as shown in FIGS. 2A-2B), and can additionally or alternatively include any other suitable elements.

The method 10 is preferably performed using the system 20, such as used to locate the vehicle(s) of the system 20. However, the method 10 can additionally or alternatively be performed using any other suitable system.

2. Benefits.

The system and method can confer several benefits over conventional systems.

First, the method can navigate a user to a vehicle in a substantially accurate manner (e.g., to within a predetermined distance from the vehicle). In examples, this can be accomplished using short range techniques and/or providing images to the user to give contextual clues as to where the vehicle is located.

Second, variants of the method can leverage indoor/outdoor detection to determine the vehicle's availability state. The indoor/outdoor detection can additionally or alternatively be used to determine the probability of the vehicle's location information containing sensitive content. This probability can, in turn, be used to determine how the vehicle location information should be handled (e.g., how the information should be processed prior to presentation to a user). However, the indoor/outdoor determination can be otherwise used. Indoor/outdoor detection can be determined by observing and processing information collected from sensors. For example, a reading from a sensor can be compared to a reference parameter to determine if the vehicle is indoor (e.g., matching a temperature reading with the local temperature). In variants, indoor/outdoor detection can be determined by classifying images using a parametric and/or a non-parametric classifier, by classifying audio data, and/or by classifying ambient light.

Third, in variants of the method, vehicle images can be obtained and selectively provided to the user to help the user locate the vehicle (e.g., determine if the vehicle is occluded behind a large object, or if the vehicle is in an otherwise inaccessible state). The vehicle images can depict the vehicles in context (e.g., include enough of the surrounding scene to include landmarks), depict the portions of the vehicle's ambient environment, and/or depict any other suitable scene. In these variants, the images can optionally be selectively processed or provided to the user to ensure they don't contain sensitive content.

However, the method can confer any other suitable set of benefits.

2. System.

Figure 3A:
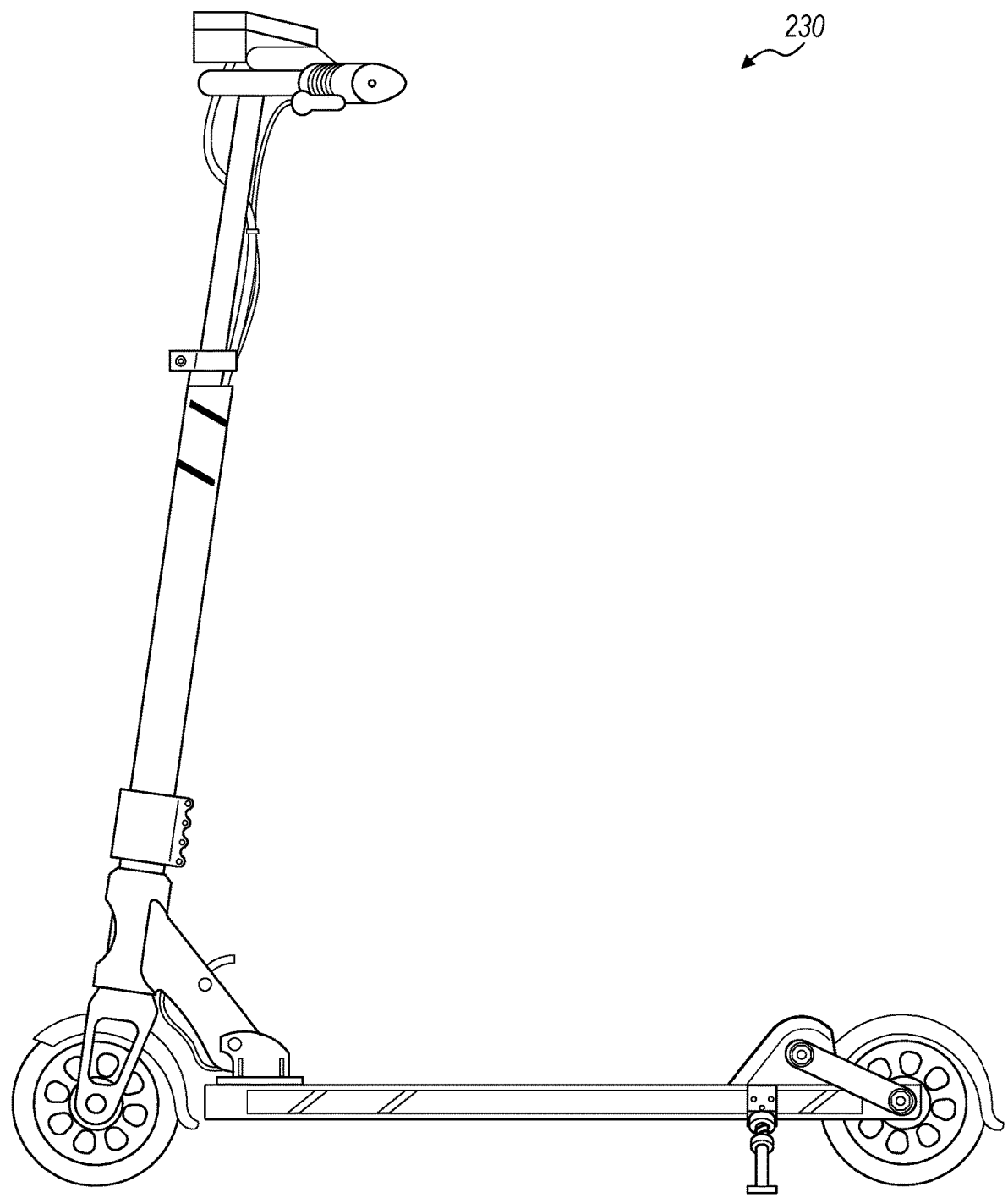
FIGS. 3A-3C depict specific examples of a vehicle of the system.
Figure 3B:
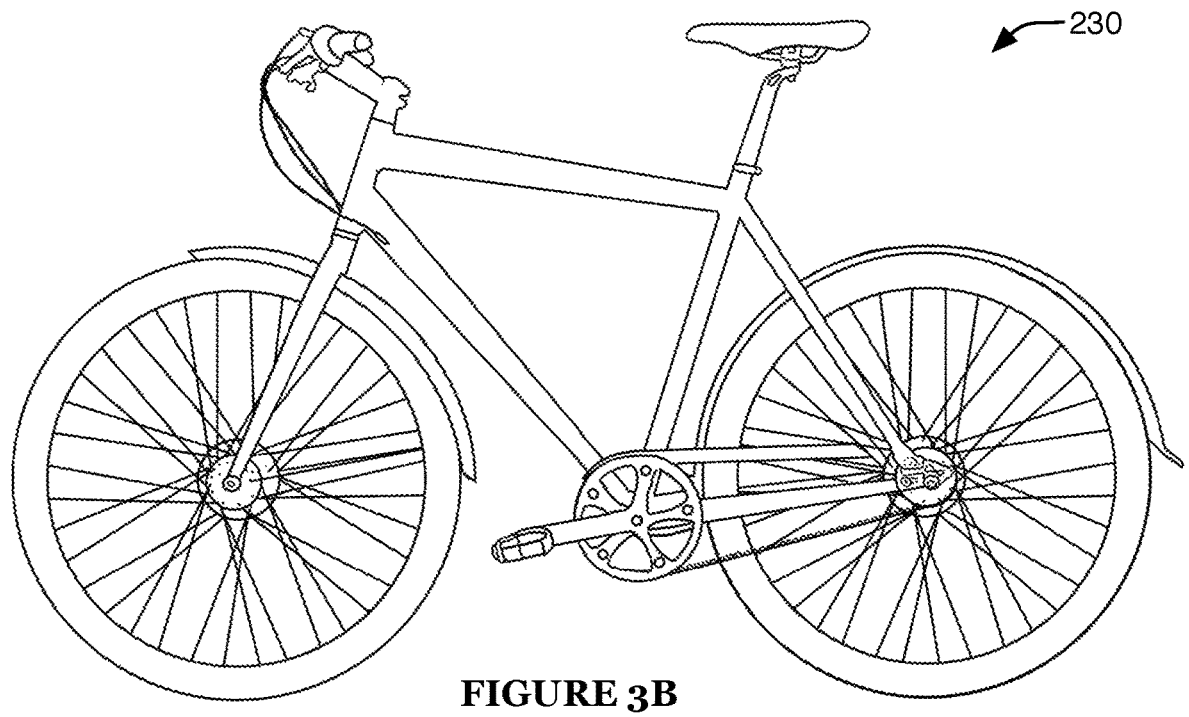
Figure 3C:
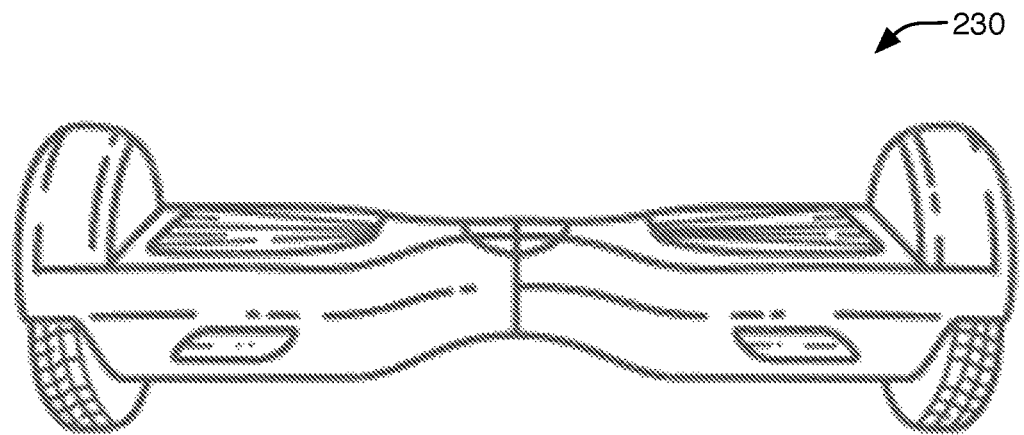

The system 20 preferably includes one or more vehicles 230. Each vehicle is preferably a terrestrial vehicle, more preferably a wheeled vehicle (e.g., as shown in FIG. 3A-3C). The vehicle is preferably light-weight (e.g., less than a threshold weight, such as 10, 25, 50, 100, 150, or 200 lbs.) and/or compact, but can additionally or alternatively have any suitable size, shape, and/or weight. The vehicle is preferably operable to transport one or more people (vehicle users), which can include, for example: passengers such as drivers, operators, passive riders, and/or any other suitable vehicle users. For example, the vehicle can be operable to transport one person, two people, and/or any other suitable number of people. In examples, the vehicles can include: scooters (e.g., including two substantially inline wheels; a platform bridging the wheels and operable to support one or more riders, preferably standing riders; and/or a handle extending upward from the front wheel and/or platform, preferably operable to steer the scooter, such as by rotating the front wheel relative to the platform in response to handle rotation), bicycles and/or tricycles, skateboards, velocipedes (and/or velocipedes modified to be additionally or alternatively propelled by mechanisms other than the rider(s), such as propelled by one or more electric motors), super- and/or ultra-lightweight passenger vehicles, and/or any other suitable vehicles.

The vehicle is preferably a motorized vehicle (e.g., including one or more motors, preferably electric motors, operable to propel and/or control the vehicle), more preferably a remotely-controllable motorized vehicle (e.g., operable to receive control instructions from a remote controller 210, such as a remote computing system, and control or modify vehicle operation based on the instructions). The motorized vehicle preferably includes one or more motor controllers, which can be operable to accept control inputs from user input devices (e.g., vehicle-integrated devices, such as a throttle and/or brake control device, etc.), local computing devices 220 (e.g., user device), and/or remote controllers.

The vehicle preferably includes one or more communication modules (e.g., wireless communication module). The communication modules can include long-range communication modules (e.g., supporting long-range wireless protocols), short-range communication modules (e.g., supporting short-range wireless protocols), and/or any other suitable communication modules. The communication modules can include cellular radios (e.g., broadband cellular network radios), such as radios operable to communicate using 3G, 4G, and/or 5G technology, Wi-Fi radios, Bluetooth (e.g., BTLE) radios, NFC modules (e.g., active NFC, passive NFC), Zigbee radios, Z-wave radios, Thread radios, wired communication modules (e.g., wired interfaces such as USB interfaces), and/or any other suitable communication modules.

The vehicle preferably includes one or more sensors. The sensors can include one or more: location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), cameras (e.g., CCD, CMOS, multispectral, visual range, hyperspectral, stereoscopic, etc.), spatial sensors (e.g., inertial measurement sensors, accelerometer, gyroscope, altimeter, magnetometer, speedometer such as a wheel rotation sensor, etc.), audio sensors (e.g., transducer, microphone, etc.), barometers, light sensors, thermal sensors (e.g., temperature and/or heat sensors), current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, time of flight sensors (e.g., sonar, radar, lidar, rangefinder such as optical rangefinder, etc.), and/or any other suitable sensors.

The vehicle preferably includes one or more outputs. The outputs can include audio outputs (e.g., speakers), visual outputs (e.g., display screens, light emitters such as LEDs, etc.), haptic and/or tactile outputs (e.g., vibratory outputs), and/or any other suitable output elements.

The vehicle preferably includes one or more power sources. The power source preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. However, the vehicle can additionally or alternatively include any other suitable elements.

The vehicle can be associated with one or more vehicle identifiers. A vehicle identifier can include an alphanumeric identifier, a visual identifier (e.g., color, light pattern), a vehicle image associated with the vehicle, a graphical icon, and/or any other suitable identifier.

The system 20 preferably includes one or more computing systems. The computing systems can include one or more remote computing systems (e.g., network-connected servers), which are preferably operable to communicate with and/or control the vehicle (e.g., via one or more communication modules, preferably wireless communication modules). The computing systems can additionally or alternatively include one or more user devices (e.g., smartphones). For example, the user devices can be operable to mediate user interactions with the vehicle. The user devices can be operable to communicate directly with the vehicle (e.g., via one or more communication modules, preferably wireless communication modules), but can additionally or alternatively communicate with the vehicle via one or more other computing systems (e.g., remote computing system) and/or in any other suitable manner (and/or not communicate with the vehicle). The computing systems can additionally or alternatively include one or more on-board processing systems (e.g., on-board the vehicle). Examples of the on-board processing system include: a user device (e.g., smartphone), one or more: GPUs, CPUs, microprocessors, dedicated image-processing hardware, or any other suitable processing system. However, the system can include any suitable set of computing systems.

The system 20 can additionally or alternatively include one or more computer readable media. The computer readable media can be a database 240, but can additionally or alternatively include RAMs and/or ROMs, flash memory, EEPROMs, optical devices (CD or DVD), hard drives, floppy drives, or any suitable storage device.

The system 20 can additionally or alternatively include one or more external sensors (e.g., sensors separate from the vehicle(s)). The external sensors can include, for example: optical sensors such as video cameras and/or other cameras (e.g., installed cameras, such as security cameras and/or roadway-monitoring cameras; transient cameras, such as cameras of user devices such as smartphones; etc.), vehicle sensors (e.g., inductive loops and/or weight sensors installed in roadways), radio-based sensors (e.g., radio communication devices such as Wi-Fi access points, cellular network towers and/or other access points, Bluetooth beacons, etc.), and/or any other suitable sensors. However, the system can additionally or alternatively include any other suitable elements.

Figure 5:
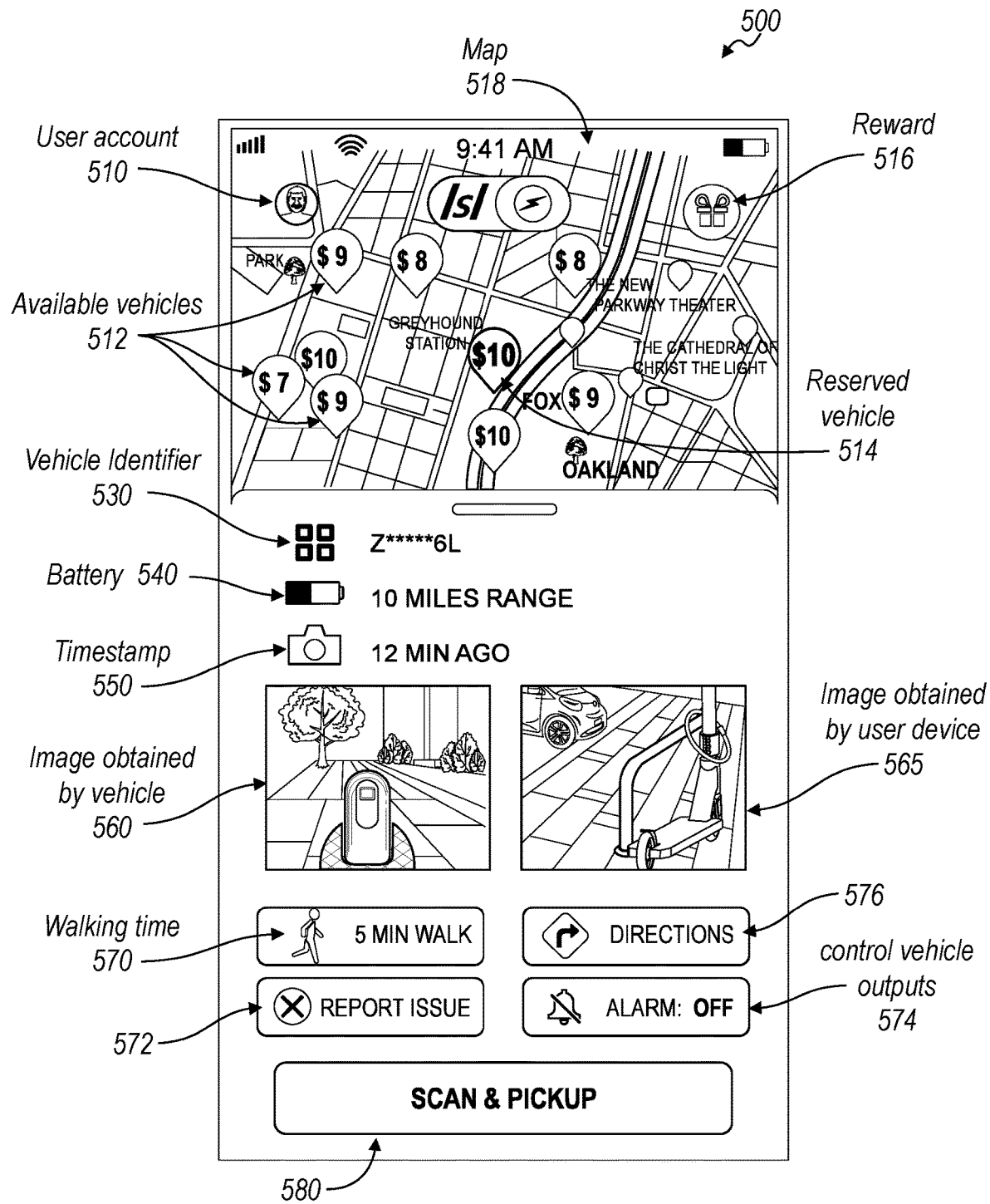
FIG. 5 is a variation of the display presented on the client application.

The system 20 can additionally or alternatively include one or more client applications, example shown in FIG. 5. The client application functions to serve vehicle information to the user (e.g., vehicle location, vehicle accessibility, images of the vehicle, audio near the vehicle, etc.). The client application can be one or more: native applications executing on the one or more computing systems; browser applications; cross-platform applications; or any other suitable program. The client application can be configured for use by a user. A user can be a rider, vehicle management personnel (e.g., a ranger), a management service, or any other suitable entity. The client application can be associated with one or more user accounts 510. Each user account can additionally or alternatively be associated with user information, wherein the user information associated with a user can be collected by the client application (e.g., directly from user interaction with the client application, directly from sensor measurements sampled by the user device that the client application is executing on, indirectly from vehicle sensor measurements transmitted to the client application, etc.). The information can be transmitted to a remote computing system.

Figure 6:
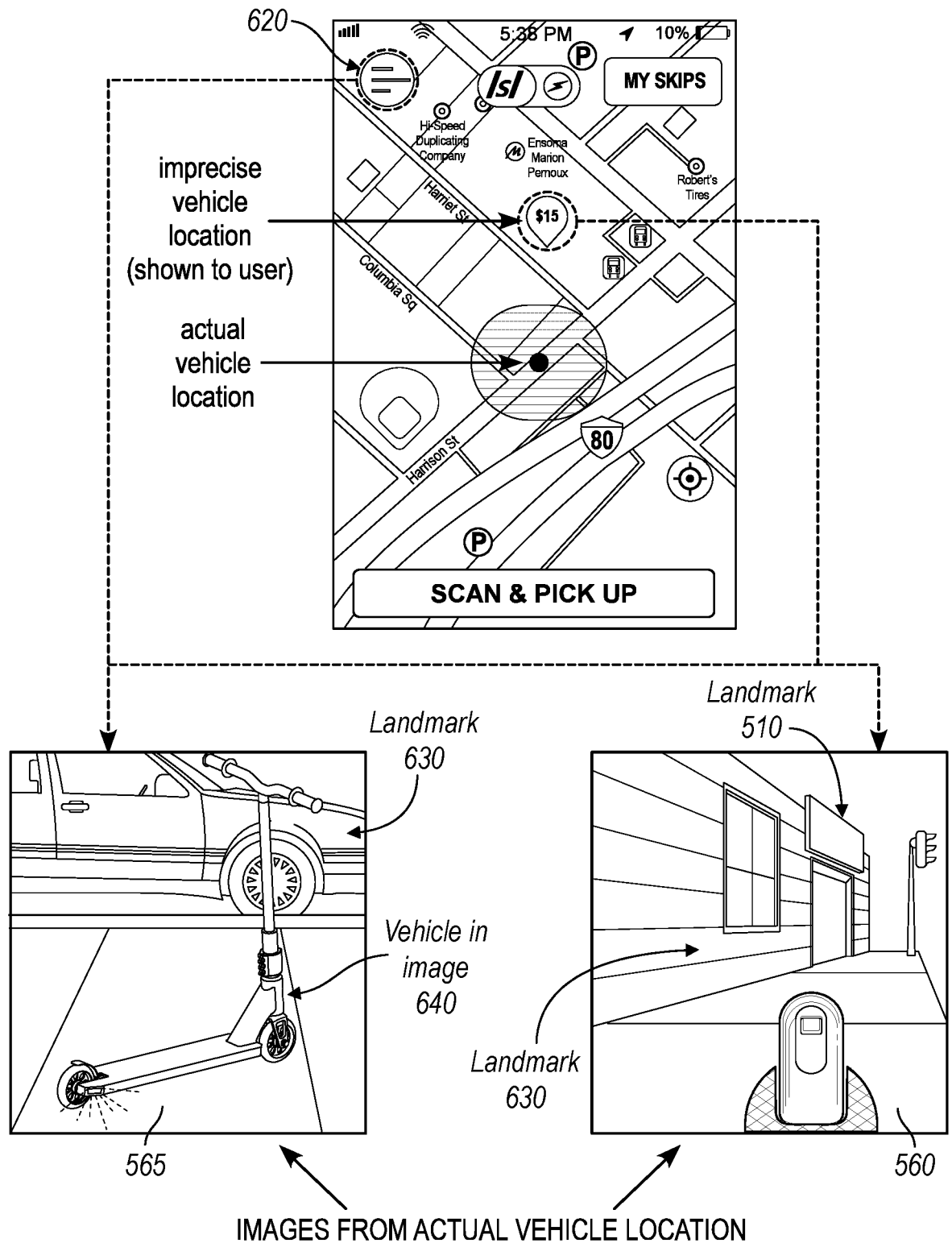
FIG. 6 is a variation of the display on the client application where the image information associated with the vehicle can be accessed via a drop down menu.
Figure 7:
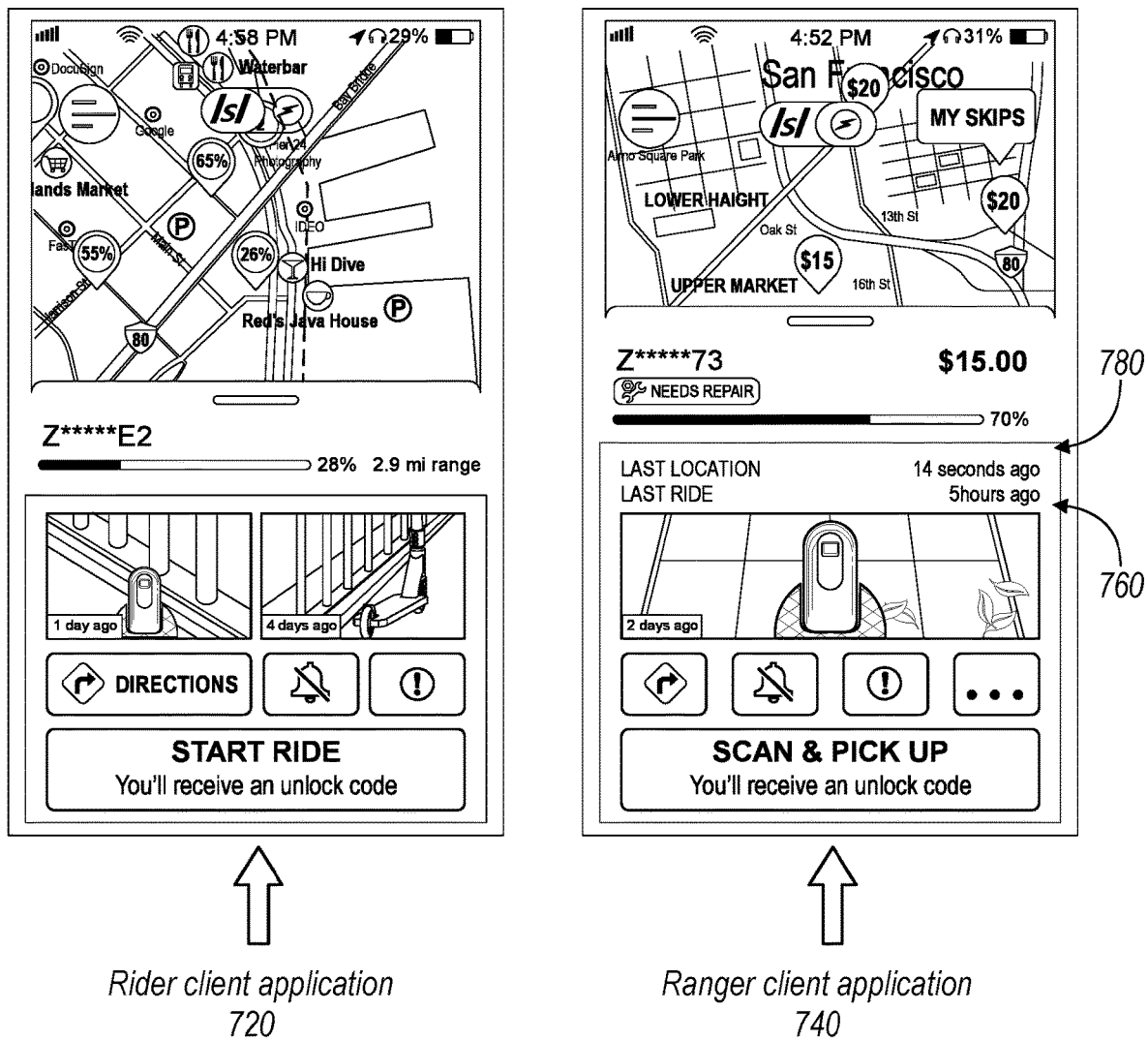
FIG. 7 is an example of a display presented on a rider application and an example of a display presented on a ranger application.

The client application preferably includes a graphical display. The graphical display can enable a user to: select a vehicle (e.g., for reservation), find a vehicle (e.g., physically locate the vehicle), control the vehicle (e.g., reserve the vehicle), or otherwise interact with the vehicle. For example, as shown in FIG. 5, FIG. 6 and FIG. 7, the graphical display can include the following elements: option to view a user account 510, option to view a reward 516, option to select/reserve a vehicle 514 from a set of available vehicles 512, wherein the set of available vehicles is optionally arranged on a map 518, a vehicle identifier 530, vehicle image(s), the available battery power 540, the walking time 570 to the selected/reserved vehicle, an option to report an issue 572, an option to control the vehicle outputs (e.g., sound, light, etc.) 574, an option to view directions 576 to the vehicle, an option to scan and pickup the vehicle (e.g., begin ride session)580, and/or any other suitable elements. In one example, the images 560 and 565 are accessible via a drop down menu 620. In a second example, the images (560, 565) are accessible by selecting a graphical icon representative of the vehicle. However, the vehicle information can be presented in response to receipt of any other suitable user input.

In one variation, the system can include a client application configured for a rider 720 (rider application), which functions to provide the rider with vehicle information and to facilitate location of the vehicle. In one example, the rider application can include an option for viewing a route to a vehicle, an option for viewing the available vehicles (e.g., unreserved vehicles, vehicles associated with an inactive riding session, vehicles located in accessible locations, etc.), an option for viewing a vehicle image, and/or any other suitable option.

In a second variation, the system can include a client application configured for management entity personnel 740 (ranger application), which functions to provide the ranger with vehicle information and to facilitate location of the vehicle. In one example, the ranger application can include the options included in the client application, as well as an option to not-serve a vehicle, an option for obtaining on-demand images/video stream captured by the vehicle, an option for viewing an image associated with the most recent ride (e.g., last ride photo), an option for presenting the probability of the vehicle being located indoor or outdoor, an option for streaming the audio input of the vehicle, an option to notify a management entity if the vehicle can't be found, and/or any other suitable option. The ranger application can optionally display vehicle timestamps (e.g., last location 780 of vehicle, most recent/last ride 760, etc.), vehicle alerts (e.g., needs repair), and/or any other suitable information.

3. Method.

3.1 Determining Vehicle Information.

Determining vehicle information S100 preferably functions to determine information associated with a vehicle. The vehicle information can include geospatial position information (e.g., geospatial coordinates), accessibility information, environmental information, and/or any other suitable information. For example, S100 can include determining the precise geolocation of a vehicle, determining the vehicle accessibility (e.g., determining whether the vehicle is publicly accessible), and/or characterizing the ambient environment surrounding the vehicle (e.g., determining a map of objects near the vehicle, determining whether the vehicle is in a high-traffic area, etc.).

S100 is preferably entirely performed by a remote computing system (e.g., server system such as one or more internet-connected servers), but can alternatively or additionally be partially or entirely performed by a vehicle, by user devices, crowdsourced across multiple vehicles, and/or by any suitable computing system. The underlying data used in S100 (e.g., sensor data) can be transmitted from the data-generating device (e.g., vehicle) to the computing system either directly or indirectly (e.g., via an intermediary). However, S100 can be otherwise performed by any suitable system. S100 can be performed on a schedule, when the vehicle is stationary for a threshold time period, and/or at any suitable time.

S100 can be performed: after termination of a ride session, after a vehicle has been moved, after the vehicle has been static for a predetermined period (e.g., 10 hours), after receipt of a vehicle information request from a user (e.g., from a client application), or at any other suitable time. Termination of a ride session can be determined: in response to receipt of an image associated with the vehicle (e.g., wherein the vehicle is an object in the image, wherein the image is sampled by the vehicle, etc.); in response to receipt of an "end session" command from the rider application; after the vehicle is static for more than a predetermined duration (e.g., 5 minutes, 10 minutes, 20 minutes, etc.); after the user device executing the rider application is not detected by the vehicle for a predetermined duration (e.g., 5 minutes, 10 minutes, 20 minutes, etc.); or otherwise determined. The vehicle can be considered to have been moved when: the vehicle velocity (e.g., detected by the vehicle, determined from periodic vehicle location updates, etc.) is greater than a predetermined velocity (e.g., greater than zero); the vehicle acceleration (e.g., detected by the vehicle) is greater than a predetermined acceleration (e.g., greater than zero); detecting a predetermined amount of wheel rotation (e.g., 3 wheel rotations, 10 wheel rotations, etc.); detecting the distance traveled is greater than a predetermined amount (e.g., 10 feet); when the scene monitored by the vehicle's on-board optical sensor changes beyond a predetermined amount; or otherwise considered to have been moved.

Geospatial position information can be determined based on GNSS information (and/or enhanced GNSS information, such as RTK-GPS information, GNSS information supplemented by IMU and/or other positioning information, etc.), radio environment information (e.g., characteristics such as identifiers, RSSIs, and/or angles of arrival (AOA) associated with radios, such as Wi-Fi radios, Bluetooth beacons, cellular network radios, etc.), spatial sensor information (e.g., determined based on measurements sampled by one or more IMU sensors, such as accelerometers, gyroscopes, and/or magnetometers, and/or by one or more speedometers such as wheel rotation sensors), environmental mapping information (e.g., image recognition of environmental elements such as street signs and/or landmarks, such as performed using computer vision techniques; spatial mapping, such as using one or more time of flight sensors; etc.) preferably including correlation of the determined information (e.g., environmental elements, spatial maps, etc.) with map data (e.g., predetermined map data), routing or navigation instructions, and/or any other suitable information.

Geospatial position information can additionally or alternatively be determined based on positions of other devices (e.g., user devices, other vehicles, etc.), such as devices within detection range of the vehicle (e.g., devices detectable by the vehicle and/or devices that can detect the vehicle), preferably devices for which a geospatial position (and/or information associated with geospatial position) is known. For example, geospatial position information associated with other devices (e.g., vehicles, user devices, etc.) within direct communication range of the vehicle (e.g., via short- and/or intermediate-range wireless communication methods, such as Bluetooth and/or Wi-Fi) can be used to determine the vehicle position. In a first example, information associated with the relative arrangement of the devices with respect to the vehicle (e.g., distance, direction, etc.) is used in addition to the other devices' geospatial position information, such as information determined based on RSSI and/or angle of arrival (AOA). In a second example, the ability to detect and/or communicate with the other devices is used as a proxy for relative arrangement determination (e.g., representing an approximate maximum threshold for device separation). In a third example, image information associated with the vehicle can be presented to the user. However, the geospatial position information associated with other devices can additionally or alternatively be used in any other suitable manner.

Geospatial position information can optionally be determined using dead reckoning techniques (e.g., using spatial sensor information to determine displacement from a previously determined location, such as a location determined based on GNSS information), data fusion techniques (e.g., combining GNSS information and spatial sensor information, combining position information from multiple vehicles and/or other devices, etc.) such as techniques employing a Kalman filter and/or extended Kalman filter, and/or any other suitable techniques. However, the geospatial position information can additionally or alternatively be determined in any other suitable manner.

Figure 13:
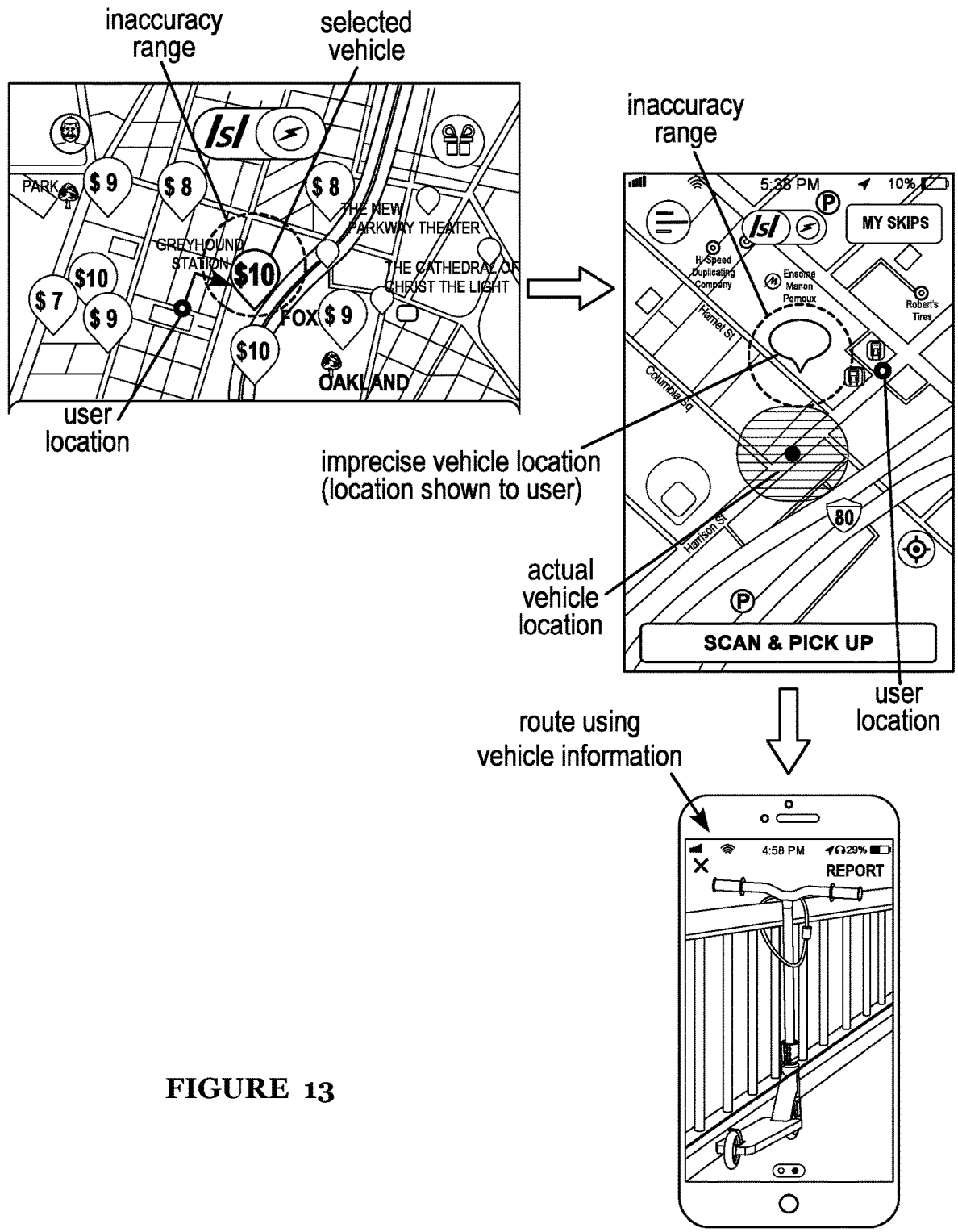
FIG. 13 is a schematic representation of an example of facilitating user location of a vehicle.

In one variation, example shown in FIG. 6, determining geospatial position information can include: determining an imprecise vehicle location 605 and determining a refined vehicle location 610 (example shown in FIG. 13). The imprecise vehicle location information can be sensor information, user device information, GPS or GNSS information, information determined by dead reckoning techniques, or any other suitable information. The sensor information is preferably sampled by the vehicle, but can additionally or alternatively be determined by a remote computing system based on signals received at the vehicle and transmitted to the remote computing system. However, the imprecise vehicle location can be otherwise determined.

The refined vehicle location is preferably determined (e.g., calculated, selected, estimated, etc.) based on the imprecise vehicle location and the vehicle information, but can alternatively or additionally be determined based on only the vehicle information, or otherwise determined. The refined vehicle location can be determined: in response to user entry into a radius of inaccuracy about the (imprecise) vehicle location; in response to a predetermined user proximity to the vehicle; in response to user device connection to the vehicle (e.g., to a local area network generated by the vehicle); or at any other suitable time. In a specific example, determining the refined vehicle location can include: connecting to a local area network generated by the vehicle (e.g., Bluetooth, WiFi, etc.), and determining the refined vehicle location (and/or guiding the user to the vehicle) based on changes in the RSSI of the LAN. In a second specific example, determining the refined vehicle location can include trilaterating the vehicle location based on a series of signals received from the vehicle. In a third specific example, determining the refined vehicle location can include determining the vehicle location relative to the user device based on the angle of arrival of the vehicle signals. In a fourth specific example, determining the refined vehicle location can include notifying the user that the vehicle is a predetermined distance away (e.g., determined based on the RSSI of a signal received at the user device) in response to the user device receiving a signal from the vehicle (e.g., NFC signal, BLE signal, etc.). In a fifth specific example, determining the refined vehicle location information can additionally or alternatively include presenting image information associated with the vehicle on the user device.

In a second variation, geospatial position information can be determined from image information. In a first variation, the image information can be extracted by the user from a vehicle image presented on the client application. In a second variation, the image information can include features. The features can be extracted to determine a location fingerprint, which can determine a refined vehicle location. However, the geospatial information can be otherwise determined based on any other suitable information.

Accessibility information preferably includes information indicative of the public accessibility of the vehicle location, such as whether the vehicle is located (e.g., parked) in a public and/or publicly-accessible location (e.g., street, sidewalk, public park, building forecourt, etc.) or in a private and/or publicly-inaccessible location (e.g., building interior such as a private building interior, restricted-access yard such as a fenced and/or walled yard, military base, amusement park, etc.).

Accessibility information can optionally be determined based on geospatial position information (e.g., correlated with accessibility map data, such as map data including publicly-accessible and/or -inaccessible regions). For example, based on geospatial position information indicative of vehicle location within an inaccessible region, such as a residential property, the vehicle can be determined to be inaccessible.

Accessibility information can additionally or alternatively be determined based on sensor information, such as information sampled by sensors of the vehicle (e.g., sensors described above, such as regarding the system 20) and/or of other devices (e.g., devices within detection and/or communication range of the vehicle). In some embodiments, such information is used to determine whether the vehicle is indoors (e.g., in a building interior) or outdoors (e.g., wherein vehicles located indoors are determined to be inaccessible or likely inaccessible).

Accessibility information can additionally or alternatively be determined based on information determined in S200 (e.g., if the user does not relocate the vehicle following S200, such as if the user fails to locate the vehicle and/or if the user chooses not to operate the vehicle; if the vehicle has returned to a location near its location during a previous performance of the method; etc.). However, accessibility can additionally or alternatively be determined based on any other suitable information.

Accessibility information is preferably determined for parked vehicles (e.g., idle vehicles, vehicles not in use, etc.), but can additionally or alternatively be determined for vehicles during user operation and/or any other suitable vehicles. Accessibility information can be determined continuously; periodically; sporadically; in response to one or more triggers, such as a user session ending, the vehicle entering a parked and/or idle state, vehicle movement detection (e.g., based on spatial sensor data, GNSS information, etc.) such as while the vehicle is in a parked and/or idle state, receipt of a location request (e.g., from the remote computing system, a user device, etc.), etc.; and/or with any other suitable timing.

In one variation, sensor information (e.g., image information, ambient light information, ambient sound information, location information, etc.) is fed into one or more trained classifiers, wherein the classifier can output: an accessibility class or label (e.g., binary yes/no), a vehicle environment class or label (e.g., indoor or outdoor), a numerical score (e.g., predicted likelihood of being inaccessible), a ranking, and/or any other suitable class, label, or other information. In a second variation, accessibility can be determined based on signal patterns. For example, the vehicle can be considered inaccessible when the sensor signals (from a predetermined set of sensors) substantially match a predetermined signal pattern. In a third variation, accessibility can be determined based on whether the sensor information substantially matches reference information, wherein the reference information is associated with an accessibility parameter. However, accessibility can be otherwise determined from sensor information.

In a second variation, the indoor or outdoor class label could be determined by a label detection API. If the image is not labelled, a default label (e.g., indoor) could be assigned to the image.

Environmental information preferably includes information associated with the vehicle's surroundings, such as information associated with sensor data sampled by sensors of the vehicle. Such information preferably includes information that may facilitate a user's efforts to locate the vehicle (e.g., by providing contextual information about the vehicle's surroundings). Such information can include, for example, images sampled by vehicle cameras. Such information can additionally or alternatively include local maps generated based on sensor data, such as image data (e.g., stereoscopic image data) and/or proximity data (e.g., sampled by proximity sensors such as time of flight sensors). However, such information can additionally or alternatively include any other suitable information.

Environmental information can include environmental condition data (e.g., sampled from temperature sensors, humidity sensors, etc.), such as wherein the information (e.g., temperature) sampled by the environmental conditions sensors can be compared with expected values (e.g., exterior temperature), such as values determined based on weather data and/or environmental conditions sensors separate from the vehicle (e.g., environmental conditions sensors of other vehicles, such as nearby vehicles). Vehicle environmental conditions (e.g., temperature) substantially different than the expected value can be indicative of an indoor location of the vehicle (e.g., if the vehicle conditions are within a typical human comfort range such as 55-75, 60-80, 65-85, or 66-74° C.; if the vehicle conditions are closer to a typical human comfort range than the expected values are; etc.). In a specific example, in which external temperature information associated with a region around the geospatial position of a vehicle (e.g., from weather service data, from temperature sensors of other vehicles in the region, etc.) indicates an expected temperature in the range of 40-50° F., and in which the temperature sensor of the vehicle indicates an ambient temperature of 66° F., the temperature data can be determined to be indicative that the vehicle is indoors (e.g., and therefore likely inaccessible).

Environmental information can include optical data sampled from optical sensors can be used to determine vehicle information. Optical data can include: images, ambient light, or any other suitable optical measurement.

In a first variation, the optical data can include vehicle images. The vehicle images preferably include images associated with the vehicle, but can include any other suitable set of images. The vehicle images can include images captured by the vehicle 560, images captured by a user device 565 (e.g., of the vehicle), or any other suitable set of vehicle images. The vehicle image can be associated with the most recent ride (e.g., last ride photo, wherein the most recent ride can be the last ride session or ride session with a timestamp closest to the current timestamp); be the last vehicle image, determined based on a timestamp 550 associated with the image; or be any other suitable vehicle image. The vehicle images can be associated with: a timestamp (e.g., recordation timestamp), geolocation (e.g., of the device capturing the image), auxiliary data concurrently sampled with the image (e.g., motion data, ambient light data, ambient sound data, etc.), or any other suitable data. The vehicle image(s) can be: a still frame, a video, a time series, or any other suitable set of images.

In a first example, the vehicle image and/or video data can be used to recognize (e.g., using computer vision techniques) the presence and/or absence of features indicative of vehicle location accessibility (e.g., indoors, outdoors, restricted access region, etc.). Features indicative of an indoor location can include, for example: interior building features (e.g., interior flooring, walls, and/or doors), residential appliances, and/or indoor furniture. Features indicative of an outdoor location can include, for example: exterior ground surfaces (e.g., roadway, sidewalk, dirt, gravel, etc.), exterior building features (e.g., exterior walls and/or doors), vehicles (e.g., automobiles, bicycles in operation, etc.), and/or signage (e.g., road sign, business advertisement, etc.). Features indicative of a potentially restricted access region can include, for example, access restriction features (e.g., fences, walls, etc.). These features can be used to: determine whether the vehicle is accessible (e.g., wherein the vehicle is not displayed within the client application or is marked as inaccessible within the client application); determine the probability of the vehicle information including sensitive data (e.g., wherein the vehicle and/or vehicle information can be selectively presented on the client application or otherwise processed, based on the image's sensitive data probability); determine the precise vehicle location (e.g., based on the set of landmarks appearing in the scene); or otherwise used.

In a second example, the vehicle image(s) can be supplied to the user, wherein the user can navigate to the vehicle based on landmarks, proximal the vehicle, that are depicted in the scene.

In a second variation, ambient light data (e.g., intensity data) can be indicative of an indoor vehicle location. For example, anomalous light intensity values and/or temporal patterns (e.g., not corresponding to expected values and/or patterns, such as sunlight- and/or skylight-based patterns) can be indicative of an indoor vehicle location.

Environmental information can include audio data sampled from audio sensors can be used to determine vehicle information. For example, audio data can be used to recognize (e.g., using pattern matching techniques, machine learning techniques, etc.) the presence and/or absence of features indicative of vehicle location accessibility. Features indicative of an indoor location can include, for example, sounds associated with kitchens (e.g., blender, banging pots and/or pans, water faucet and/or spray nozzle running, etc.) and/or sounds associated with bathrooms (e.g., shower running, water faucet running, toilet flushing, toilet tank refilling, etc.). Features indicative of an outdoor location can include, for example, street noise (e.g., driving automobiles, honking horns, etc.), train noise, and/or animal noise (e.g., bird chirps).

Environmental information can include spatial data sampled from spatial sensors. Spatial data can include data from sensors indicative of vehicle relocation to an altitude other than the expected altitude (e.g., of a path or roadway near the vehicle location; of a path or roadway on which the vehicle was recently operated, such as immediately before relocation; etc.). In a first example, accelerometer data indicative of anomalous height changes (e.g., stair travel, elevator travel, etc.), such as changes occurring near the current parking location, can be indicative of vehicle inaccessibility. In a second example, altimeter data (e.g., from a barometric altimeter, GNSS-determined altitude, etc.) indicative of anomalous vehicle altitude can be indicative of vehicle inaccessibility.

Environmental information can include image information. Image information can include images (e.g., vehicle images), data associated with images (e.g., timestamp, such as a recordation timestamp or initial user presentation timestamp, manual information entered by user such as: poor image quality, image was not helpful, image was offensive, etc.), data associated with the vehicle (e.g., inaccessible vehicle, damaged vehicle, non-suitable vehicle, etc.), information concurrently sampled by the image-sampling device, and/or any other suitable information. The images can include one or more images (e.g., be an image set, be part of an image set).

The images can depict one or more characteristics of the area surrounding the vehicle (e.g., the vehicle's ambient environment or segment thereof, landmarks 630 indicative of accessibility such as signs, vehicles, and buildings as shown in FIG. 6, landmarks indicative of inaccessibility such as ceilings, floors; time of day, etc.), and/or encompass any other suitable portion of the scene surrounding the vehicle. The images can be used in S200 and/or in S300, or be otherwise used.

The images can be: captured by a user, more preferably a user device (e.g., using a rider application, a ranger application), but can additionally or alternatively be captured by the vehicle, an auxiliary optical sensor (e.g., street camera, passerby's user device), or by any other suitable system.

Figure 9:
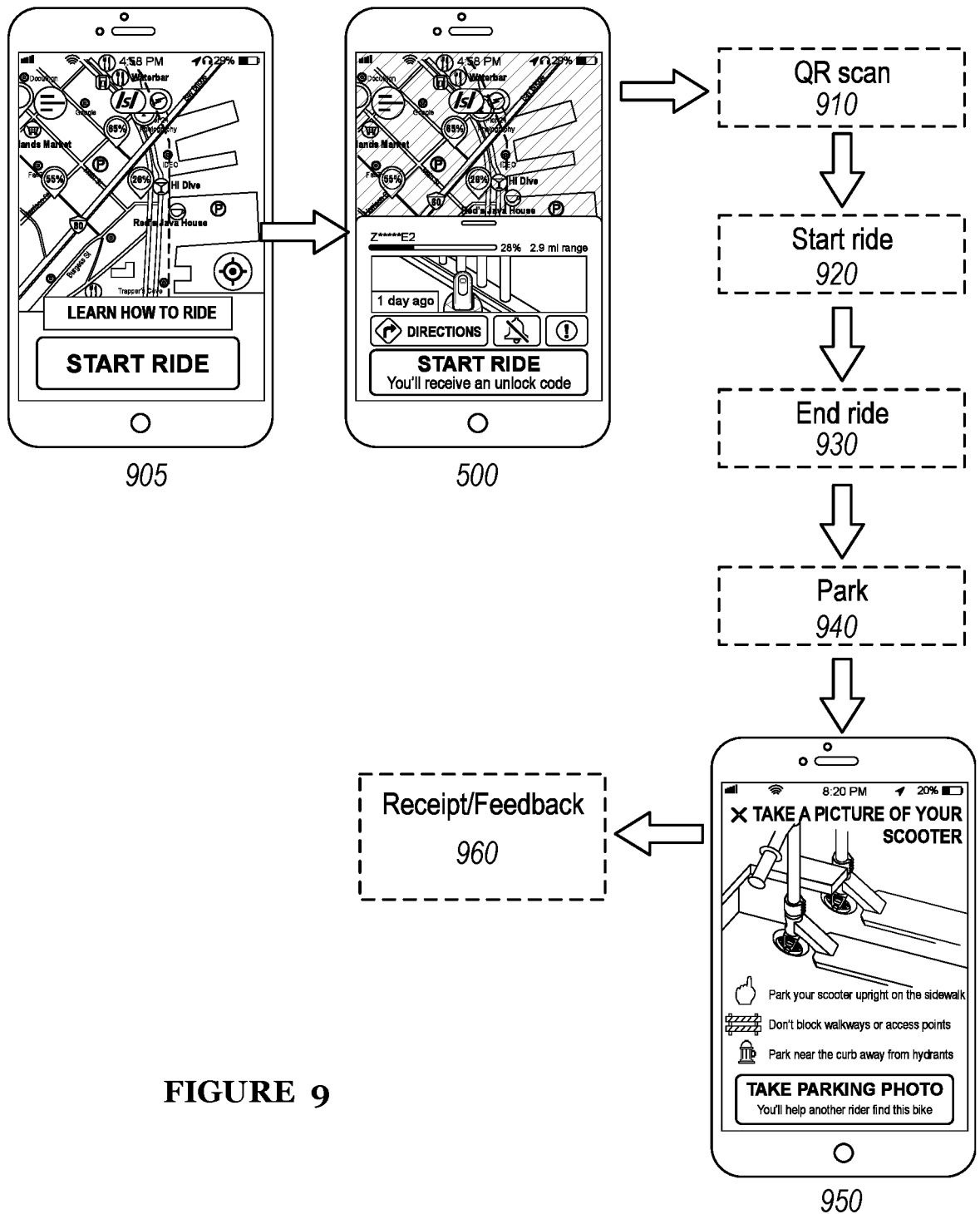
FIG. 9 is a schematic representation depicting a client application display, a vehicle reservation display, a ride session, and a ride session termination instruction display, and a ride session termination.

In a first variation of image capture, the image can be obtained by a user 565. The user can capture the image after a ride session, but can alternatively or additionally be captured before the ride session, during a ride session, or at any suitable time. For example, as shown in FIG. 9, the user can view the client application 905, select/reserve a vehicle 500, scan the vehicle 910, start the ride 920, end the ride 930, park the vehicle 940, capture an image of the vehicle 950, and receive a receipt/feedback 960 that their image has been received, wherein the receipt can terminate the ride session. A ride session can be defined as: a vehicle moving more than a predetermined threshold (e.g., 10 feet); a session defined between a start event (e.g., user selection of a "reserve vehicle" or "start" option; vehicle motion beyond a threshold distance or velocity and/or vehicle connection to a user device; etc.) and a termination event (e.g., receiving an image of the vehicle; receiving an image of the vehicle determined to be locked to a static environment object, such as a pole or a bike lock; receiving an "end" selection; expiration of a threshold time duration of the vehicle being static; etc.); or be otherwise defined. For example, a ride session can be terminated in response to receipt of an image 960, as shown in FIG. 9, the vehicle having not moved for a predetermined period of time (e.g., 30 seconds, 5 minutes, etc.) or any other suitable determination. The ride session can be terminated on a remote processing unit or any other suitable system.

The image preferably contains the vehicle 640, as shown in FIG. 6, but can additionally or alternatively be captured proximal the vehicle, and/or be otherwise related to the vehicle. In variants, the method can include determining that the image is associated with the vehicle, wherein the determination can be used to terminate a riding session, trigger ranger payment, or otherwise used.

In a first embodiment, determining image association with the vehicle includes processing the image is to determine whether the vehicle appears in the image. This processing can occur in real- or near-real time, but can additionally or alternatively occur after the session has been set as terminated. This processing is preferably performed on the capture device (e.g., by the client application), but can additionally or alternatively be performed by the remote computing system or by any other suitable system. Determining whether the vehicle appears in the image can include: identifying an object with features (e.g., color, shape, size, etc.) having a predetermined similarity to the vehicle of interest (e.g., using an object detector); identifying an optical code associated with the vehicle within the image (e.g., detecting a QR code for the vehicle in the image); or otherwise determining whether the vehicle appears in the image (e.g., from the image).

In a second embodiment, determining image association with the vehicle includes verifying an auxiliary vehicle identifier that is contemporaneously (e.g., concurrently or received within a predetermined time of) captured with the image at the capture device (e.g., user device). The auxiliary vehicle identifier is preferably generated, emitted, broadcast, unicast, or otherwise transmitted by the vehicle, but can be otherwise transmitted. The auxiliary vehicle identifier can be verified by the vehicle (e.g., wherein the capture device transmits the auxiliary vehicle identifier to the vehicle, the vehicle verifies the identifier, and transmits a verification notification to the control system and/or remote computing system); by a central control system (e.g., by the remote computing system), wherein the central control system stores or receives the true auxiliary vehicle identifier associated with the vehicle and verifies the sampled auxiliary vehicle identifier against the true auxiliary vehicle identifier; or otherwise verified. Examples of the auxiliary vehicle identifier include: a unique light or sound pattern emitted by the vehicle; a wireless device name (e.g., Bluetooth identifier, WLAN identifier, etc.); a data packet transmitted to the capture device over short-range communications; or any other suitable datum.

In a second variation of image capture, the image can be obtained by sampling the sensors mounted to the vehicle 560 (e.g., the optical sensors of the vehicle). The image can be tagged with a vehicle identifier when transmitted to the computing system. The images are preferably captured a predetermined period after a ride session termination (e.g., 30 seconds, 1 minute, 5 minutes, etc.), but the images can additionally or alternatively be captured on-demand (e.g., after receiving a capture signal from the client application or remote computing system), while the vehicle is not moving (e.g., the velocity detected by the vehicle is not greater than a predetermined velocity, such as not greater than zero, the acceleration detected by the vehicle is not greater than a predetermined acceleration such as not greater than zero, etc.), after the vehicle has been static for a predetermined period of time (e.g., 30 s, 1 min, etc.), or at any other suitable time. In an illustrative example, an image can be captured a predetermined period after a ride session, processed in the automated review system, and identified as containing in sensitive content. The remote computing system can then instruct the vehicle to capture a new image. This process will continue until a captured image is not identified as containing sensitive content. Then the image is served on the client application in association with the vehicle.

However, the images can be otherwise obtained.

The capturing can be limited by environmental context associated with high or low probability of privacy violations. For example, if environmental context associated with high probability (e.g., >50%, >75%, etc.) of privacy "violations" and a request for image capture has occurred, no image can be captured and a message can be transmitted indicating that images can't be captured at this time, or any other suitable message. In another example, if it is determined that environmental context associated with low probability (e.g., <50%, <40%) of privacy "violation" is determined, images can be captured upon request, after a predetermined period, or at any other suitable time. The environmental context privacy violation probability can be determined using a lookup table, calculation (e.g., equation, classifier such as a logistic regression, neural network, or any other suitable method). The environmental context privacy violation can be based on time of day, ambient environment, number of proximal users, number or frequency of light vehicle rentals, audio, historical probabilities, historical number of privacy violation for a set of environmental parameters, and/or otherwise determined. The image characteristics preferably include a minimum field of view (FOV), and/or any other suitable characteristic.

The image can be associated with a vehicle identifier 530. In one example, to associate an image with the vehicle identifier, when the images are received by the computing system, the system can read the vehicle's optical identifier (e.g., QR code 910, serial number, etc.) from the image. In a second example, to associate an image with a vehicle identifier, the user device is pre-associated with the vehicle (e.g., via a vehicle rental, vehicle ride session).

The images can additionally or alternatively be associated with a set of labels or classifications (e.g., indoor/outdoor, accessible/inaccessible, private content/public content, etc.). These image labels or classifications can be used to determine vehicle labels or classifications, indicative of vehicle accessibility, theft state or risk, operation state, or any other suitable vehicle parameter. The image labels (hereinafter also applicable to image classifications) can be determined in real- or near-real time, asynchronously, or at any suitable time. The image labels can be determined by the remote computing system, the capture device (e.g., the client application), or by any other suitable system. The image labels can be determined using the classifiers similar to those discussed above (e.g., the accessibility information classifiers or modules), but can be otherwise determined. The image labels can be determined based on: the content of the images themselves, auxiliary information contemporaneously captured with the images, or based on any other suitable information. When a set of images are captured, each of the images in the set can be classified to increase the confidence score of the classifier, or be otherwise used. For example, if all of the images are classified as accessible then the confidence can be 100%, a confidence associated with the classifier, or any other suitable description. The images can be captured as a burst, in 5 second intervals, in 30 second intervals, or at any other suitable frequency.

The image information can be accessible to a user and/or a management entity.

The image information can optionally be moderated. For example, the images identified by users as offensive or otherwise unhelpful will be placed in a content moderation queue for review by the management entity in the content moderation system 1000 as show in FIG. 10.

In one variation, if the image is in the content moderation queue for a predetermined period above a threshold time (e.g., 10 hours, 24 hours, etc.), the image will not be served on the client application and the image will be deleted from the database.

In a second variation, users associated with uploading particular images (e.g., offensive, helpful, unhelpful, etc.) can be flagged as a particular category of user (e.g., unhelpful user, helpful user, etc.), wherein this information could be used to reward (e.g., credits toward future ride sessions, stars, etc.) helpful users and disengage (dissuade unhelpful users from using the service, delete user accounts associated with unhelpful users, etc.).

In a third variation, users could be assigned ratings based on uploaded images, reported issues with scooter, reports of images, and/or any other suitable information associated with the image.

Access to the image information (e.g., image presentation to the user) can correspond to the state of the associated vehicle (e.g., accessible when the vehicle is not in motion, is parked, not reserved, not in an active session, etc.); the age of the image (e.g., wherein the image is not surfaced after a predetermined amount of time after image recordation); the image content (e.g., inaccessible when the image is determined to contain private information or is of an indoor scene; accessible when the image is determined to contain less than a threshold amount of private information, or is of an outdoor scene); the image quality (e.g., accessible when the image is above a threshold quality); the vehicle context (e.g., whether the vehicle is located indoors or outdoors); vehicle parameter(s); or otherwise conditioned. Images that are inaccessible or not served can be stored (e.g., by the system), deleted, or otherwise managed.

Additionally or alternatively, access to the image can be controlled based on user activity. For example, image presentation to a given user (e.g., a given client application instance) can be limited by: the number of images previously presented to the user within a predetermined timeframe (e.g., 10 images in 1 minute; 20 images in 10 minutes; etc.); the image presentation frequency; the respective image's age; the number of times or duration that a given image has presented to the user; the geographic location of the user (e.g., based on whether the user is within a predefined geofence, whether the user is within a predetermined distance of the estimated vehicle location, etc.); the user profile (e.g., whether the user has a history of high-frequency API calls, whether the user is classified as "safe"); or otherwise controlled based on any other suitable parameter.

The images and associated data can be stored in the database, but can additionally or alternatively stored in computer readable memory on the user device, on the remote computing system, stored in computer readable memory on the computing system mounted to the vehicle (e.g., retrieved in response to receipt of a client application request for the image from the remote computing system or a proximal user device), and/or be stored in any other suitable system.

Figure 12:
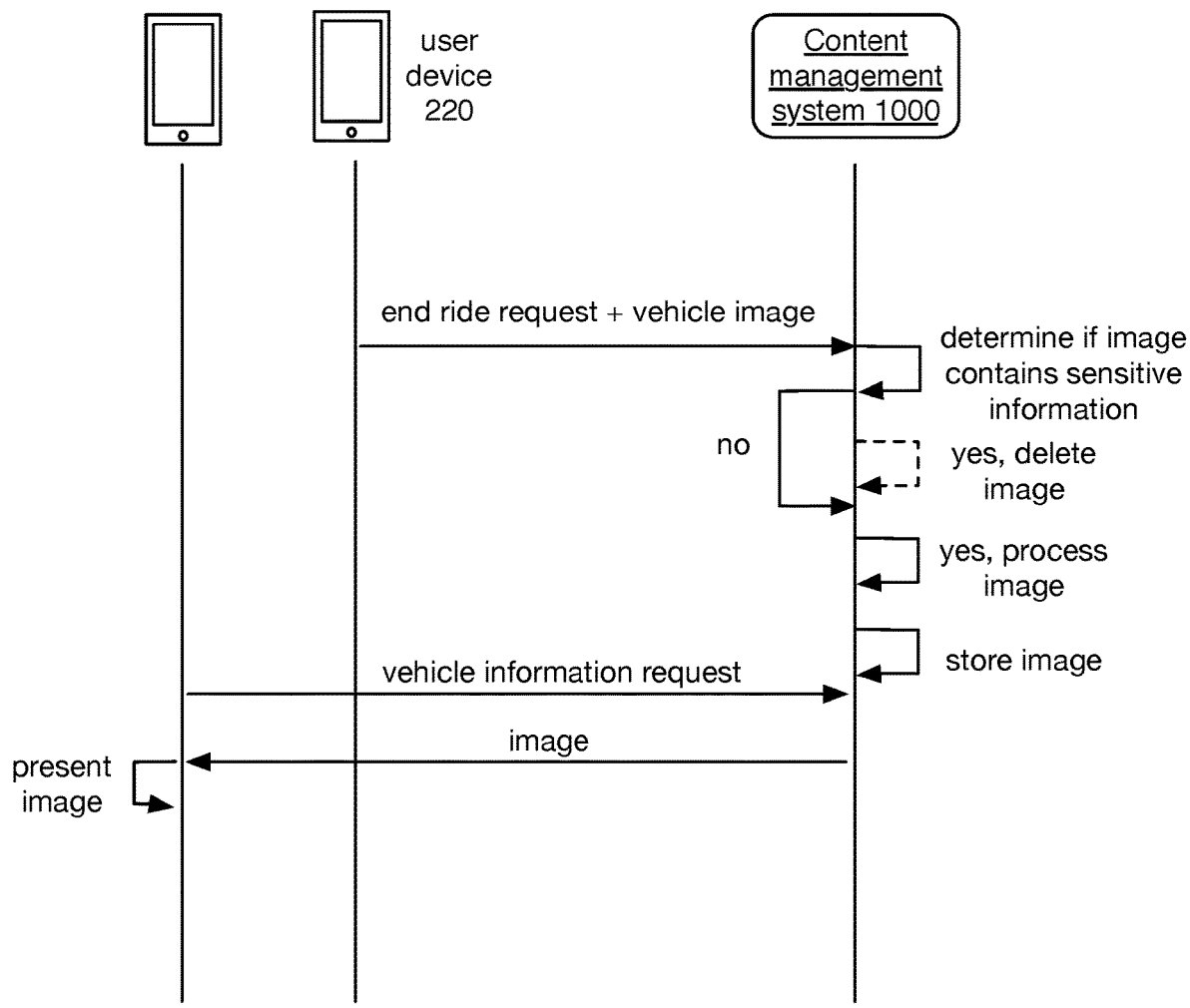
FIG. 12 is a schematic representation depicting an example of the image presentation.

Image information presented on the client application can be selectively accessible. For example, if an image is found to contain sensitive content, as shown in FIG. 12, the image will be modified, deleted, not served, or otherwise processed. In another example, if there is a litigation hold that occurs before a 24 hour modification period (e.g., the image is modified, deleted, not served, etc.) in association with an image, the images needed will be moved into a new category in the database and will not undergo modifications, deletions, or other processing. In a third example, if no privacy information is found in the image, there is no litigation hold within 24 hours, and/or if no vehicle reservation has occurred for minimum predetermined threshold (e.g., 10 hours, 24 hours, etc.), the image will not be served on the client application, the image will be removed from the content moderation queue, and the image will be removed from the database. In a fifth example, if a non-user 1010 (e.g., community member or any other human) reports (e.g., via a device such as a phone, email, etc.) sensitive content found in the image, the image will not be served and moved to the content moderation queue to be processed in a content moderation system. In a sixth example, a predetermined percentage of collected images (e.g., 20%, 35%, etc.) can be filtered through the automated review system and manually reviewed in the manual review system 1030.

Figure 10:
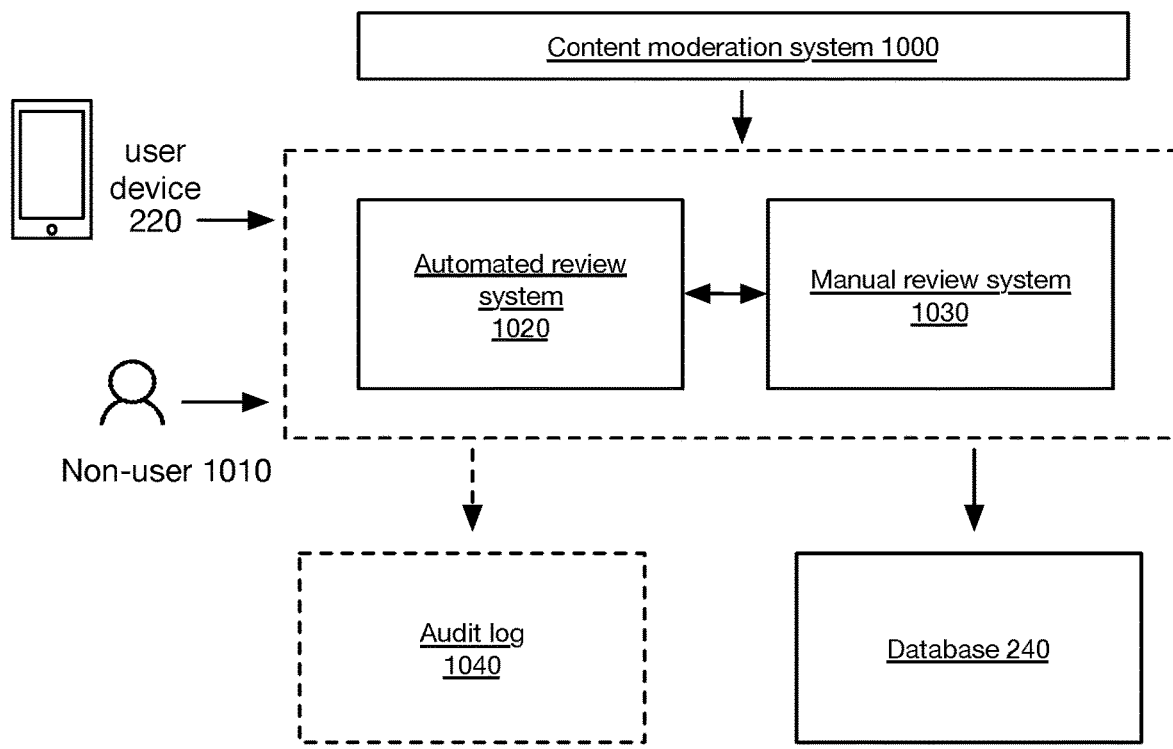
FIG. 10 is a schematic representation of the content moderation system.
Figure 11:
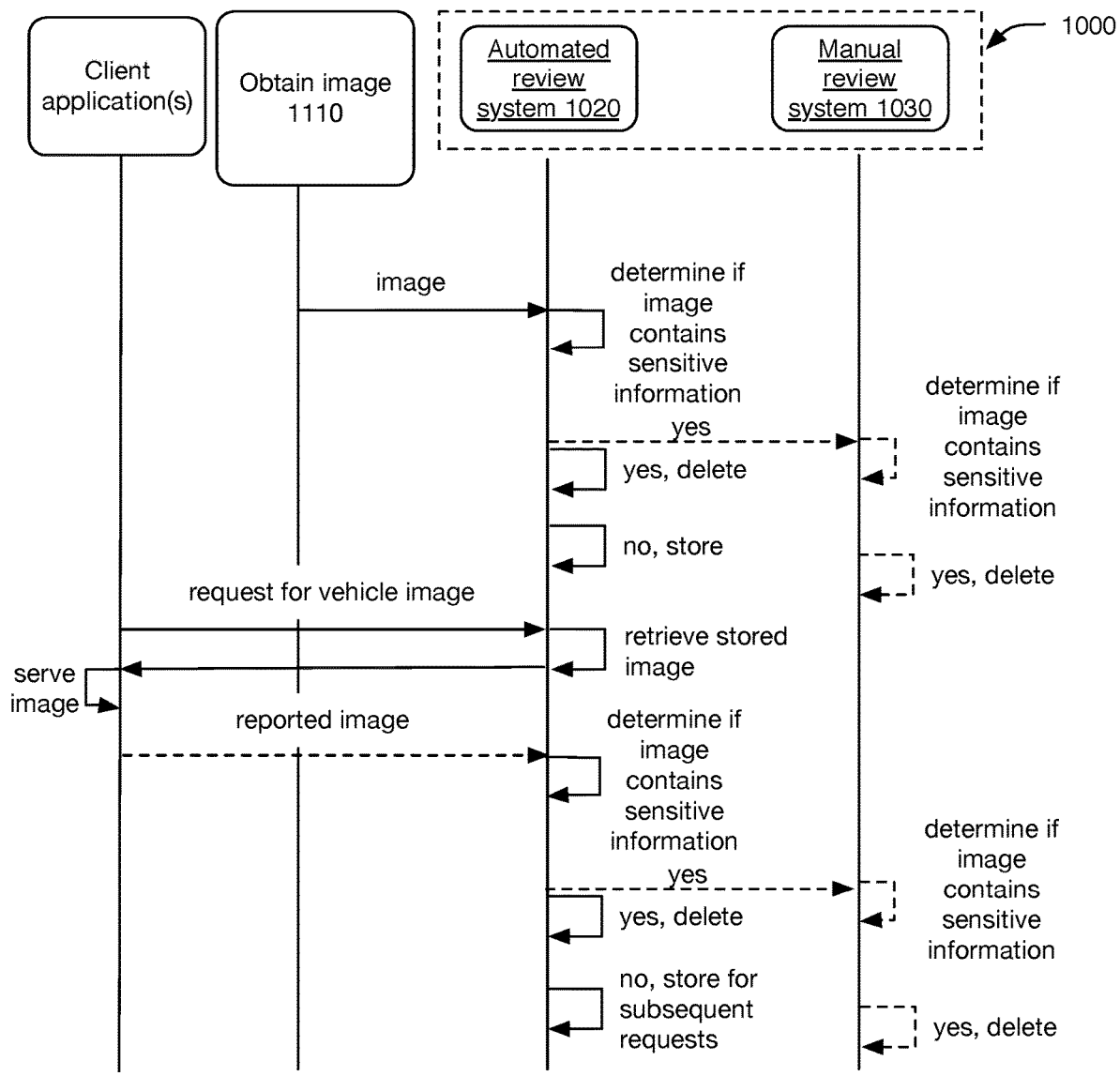
FIG. 11 is a schematic representation depicting an example of the image review process.

In one variation, when an image is obtained and/or reported (e.g., from a manual report by a user, a report from a non-user, etc.), the image is placed in a content moderation system 1000, as shown in FIG. 10, with a multitude of processes, as shown in FIG. 11, wherein each process is documented in an audit log 1040. Images can be filtered through an automated review system 1020. The review system can identify images that contain sensitive content. Images that are identified by the system can be moved to a deletion stage and will not be served on the client application. Images can be filtered through a manual review system where the images are manually reviewed. Images that are not identified by the content moderation system will be served on the client application.

The audit log can include information such as date and time the image was taken, time the image was reported, the origin of the reported image, the date and time the image entered the content moderation system, the date and time the image was filtered through the automated review system, the date and time associated with sensitive content identification by the automated review system, the date and time the image was deleted (e.g., for containing sensitive content), the date and time the image was served or re-served (e.g., after being processed by the content moderation system) on the client application, the date and time the image was deleted (e.g., manually, automatically, etc.) after a period of time (e.g. 24 hours), and/or any other suitable information.

The method optionally includes removing sensitive content from image information. Removing sensitive content can include detecting features associated with sensitive content, and removing the detected features. However, the sensitive content can be otherwise removed. Removing sensitive content can be performed on the remote computing system, on the vehicle computing system, or any other suitable location. The sensitive content can be removed in real- or near-real time (e.g., as the image is captured), asynchronously (e.g., during post-processing), or at any suitable time.

The sensitive content feature detection can additionally or alternatively be used to determine the image label or classification (e.g., the image is labeled with a predetermined label when a predetermined set of sensitive content features are detected, and/or labeled with a second predetermined label when the predetermined set of sensitive content features are not detected). However, the detected sensitive content feature(s) can be otherwise used.

The features associated with sensitive content can include: faces, license plates, ambient lighting (e.g., including wavelengths associated with sensitive data or sensitive contexts, such as wavelengths associated with indoor lighting), color features, entropy, texture features, and/or gradients, but can additionally or alternatively include any other suitable feature.

The features can be detected using SIFT, object detectors (e.g., neural networks, semantic segmentation, two-stage detectors (R-CNN), single shot detectors (SSDs, DSSD), single stage detectors (YOLO), etc.), discrete cosine transform (DCT) coefficients, HSV color model, HSL color model, and/or non-parametric method (SVM, K-nearest neighbors, etc.), but can additionally or alternatively be detected using any other suitable extraction technique.

In one variation, the method uses a single object detector trained to identify a predetermined set of sensitive content. In a second variation, the method uses an ensemble of feature detectors, each trained to identify different types of sensitive content. However, any suitable set of detectors can be used. Examples of the object detectors that can be used include: a text detector, a license plate detector (e.g., wherein a predetermined bounding box of the image could be extracted and compared to a collection of license plate images to determine if the extracted text is a license plate), a face detector, a human body detector, or any other suitable detector.

Removing the sensitive content can include: removing the sensitive content from the image (e.g., features can be removed by blurring, cropping, blackening, removing an image segment, removing the image, and/or any other suitable removal technique); not serving the image (e.g., setting the image as inaccessible, etc.); deleting the image, and/or otherwise removing the sensitive content and/or precluding sensitive content presentation to a user. However, the sensitive content can be otherwise managed.

In one example, the vehicle captures an image 30 seconds after the ride session termination. The image is assigned a hash identifier and filtered through an automated review system that includes an object detector that identifies an image with sensitive content and labels it for immediate deletion. If the image is not identified by the review system, it is served on the client application.

Figure 8:
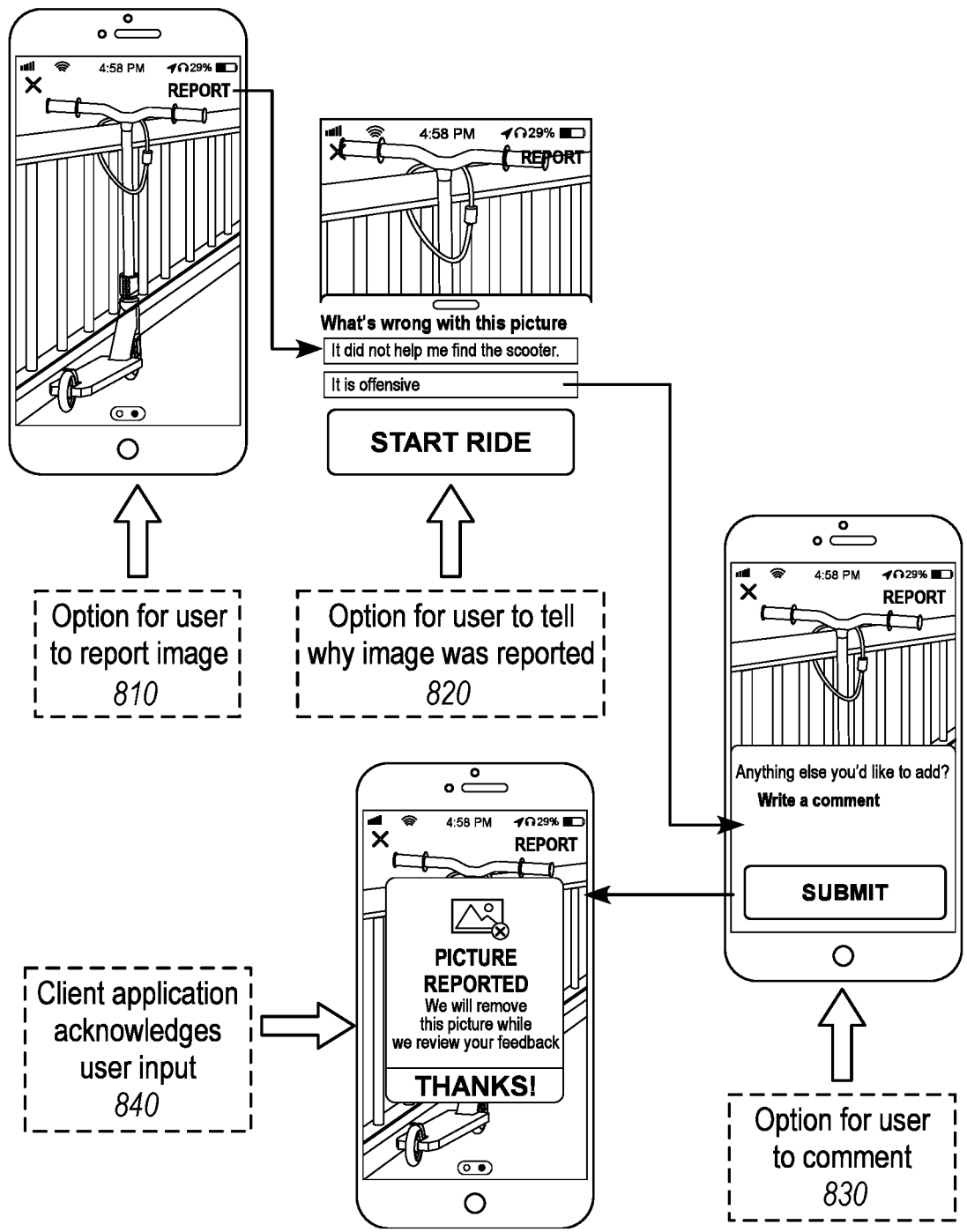
FIG. 8 is an example of the process for reporting an image, wherein the process is performed on the client application.

In a second example, the vehicle captures an image 30 seconds after the ride session termination. The image is assigned a hash identifier and filtered through an automated review system. The image is not identified to contain sensitive content and is served on the client application. In response to receipt of a user report that the image as containing sensitive content (example shown in FIG. 8), the image can then not be subsequently served by the client application, placed in a content moderation queue, and processed by the content moderation system. In one example of enabling user image reporting, the user can report an image on the client application 810, select an option for why they are reporting an image 820, comment on the image 830, and receive a notification that their report has been received 840. If the image is not identified by the content moderation system as containing sensitive content, it is re-served on the client application, as shown in FIG. 11.

However, the environmental information can additionally or alternatively include any other suitable information sampled by any suitable sensor(s), and/or the accessibility information can additionally or alternatively be determined based on sensor information in any other suitable manner.

Information determined in S100 (e.g., sensor data, geospatial position, accessibility information, environmental information, etc.) is preferably transmitted to (and/or stored by) one or more computing devices (e.g., remote computing system), but can additionally or alternatively be stored by the vehicle and/or any other suitable devices. The information can be transmitted in response to determination (e.g., immediately in response), periodically, sporadically, upon request (e.g., upon receipt of a data transmission request from the remote computing system and/or a user device), and/or with any other suitable timing. In response (e.g., immediately in response, periodically, sporadically, etc.) to receipt of the transmitted information (e.g., sensor data), the receiving device (e.g., remote computing system) can optionally determine additional information (e.g., geospatial position, accessibility information, environmental information, etc.) based on the information.

However, determining vehicle information S100 can additionally or alternatively include determining any suitable information associated with the vehicle location in any suitable manner.

3.2 Facilitating Location of the Vehicle.

Figure 4:
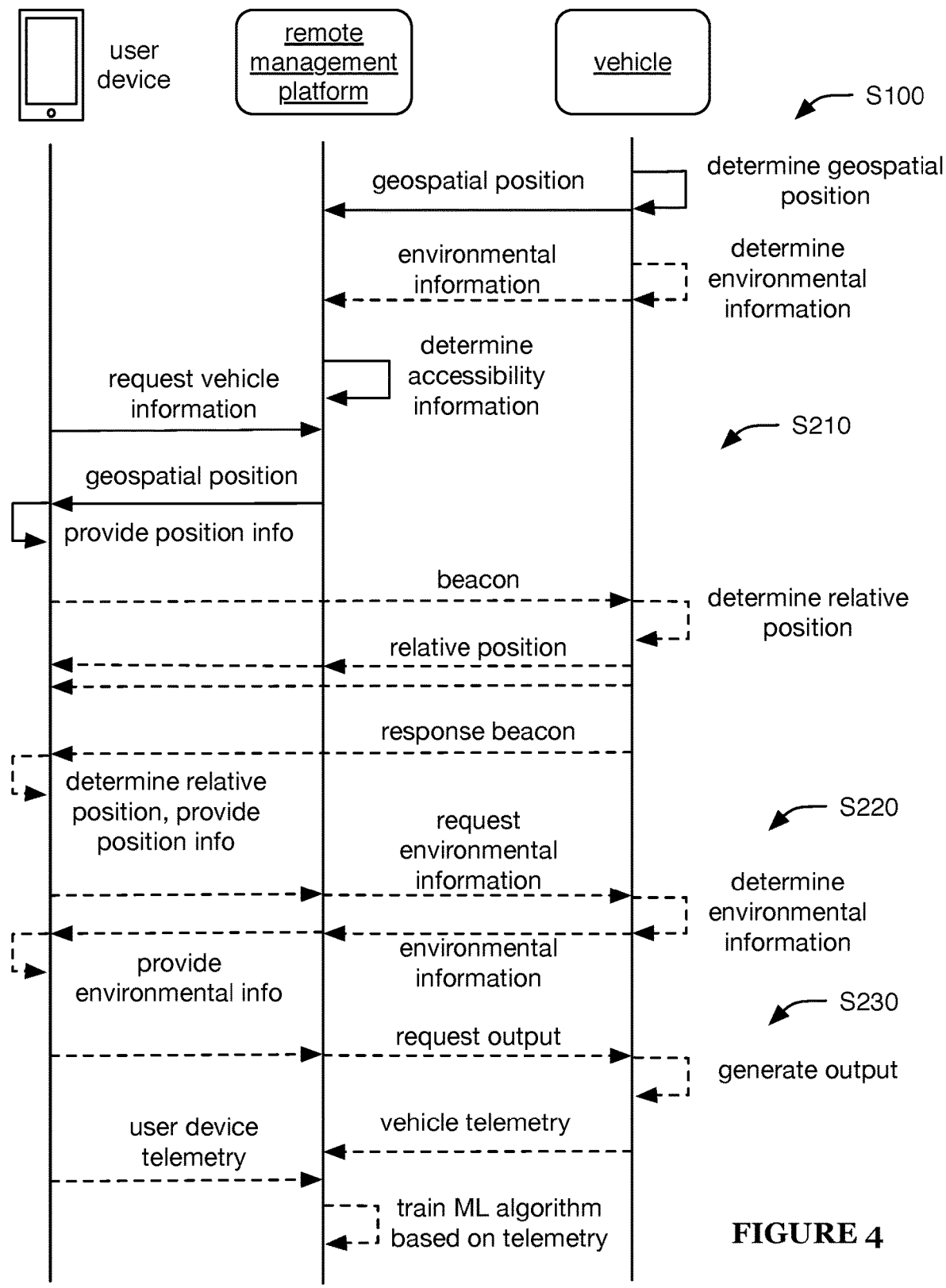
FIG. 4 is a schematic representation of a specific example of the method.

Facilitating location of the vehicle S200 preferably functions to aid a user in locating a vehicle (e.g., to enable user operation of the vehicle). S200 can include providing location information S210, providing environmental information S220, providing outputs at the vehicle S230, and/or facilitating vehicle location in any other suitable way (e.g., as shown in FIG. 4). S200 is preferably performed in response to receiving a user request for the location of one or more vehicles. Such a request can include one or more of: a user request for vehicle information, such as a map and/or list of vehicles (e.g., available vehicles near the user and/or a specified location), preferably including the vehicle; user selection of the vehicle (e.g., from the map and/or list), such as a selection associated with vehicle reservation (e.g., a vehicle reservation request) and/or vehicle location (e.g., turn-by-turn navigation request); user proximity to the vehicle (e.g., as determined based on geospatial position, user device within detection range, etc.); user request for assistance locating the vehicle (e.g., request for location information refinement, request for vehicle output generation, etc.); and/or any other suitable requests.

The location information, environmental information, and/or any other suitable information provided in S200 is preferably provided at a user device associated with the user (e.g., displayed on a user device screen, output at an audio output of the user device, etc.), but can additionally or alternatively be provided in any other suitable manner at any suitable device(s). S200 can be partially or entirely performed by the remote computing system, the vehicle, the user device, or by any suitable computing system, wherein the underlying data can be transmitted from the data-generating system (source system) to the computing system.

Providing location information S210 can include providing information determined based on geospatial position information (e.g., vehicle geospatial position information, such as determined as described above). For example, the geospatial position of the vehicle can be presented in association with (e.g., overlaid on, projected on) a map, preferably a predetermined map associated with the geospatial position. A relative position of the vehicle (e.g., with respect to the user, such as to a user device of the user) can optionally be determined (e.g., based on the vehicle geospatial position information and user geospatial position information), and information associated with the relative position (e.g., direction and/or distance to the vehicle, navigation directions to the vehicle, etc.) can be provided (e.g., overlaid on the map, separate from and/or in place of the map, etc.). For example, augmented reality can be overlaid on a map and/or the user device's camera application to assist the user in locating the vehicle. In a second example, a route on a map can be highlighted to indicate a route from the user device to the vehicle. Information determined based on geospatial position information is preferably provided if the geospatial position information (e.g., vehicle geospatial position information) is of sufficiently high quality (e.g., precision and/or confidence value greater than a threshold value), and/or if no better information is available, but can additionally or alternatively but provided in any other suitable circumstances.

Providing location information S210 can additionally or alternatively include providing information determined based on relative position data (e.g., determined based on information other than and/or in addition to geospatial position information, such as based on direct communication between the vehicle and/or user device, detection of the vehicle by the user device, detection of the user device by the vehicle, etc.). This preferably includes determining the relative position (e.g., distance and/or direction) of the vehicle with respect to the user (e.g., to a user device), such as by locating the vehicle using the user device and/or locating the user device using the vehicle. For example, determining the relative position can include: at a first device (preferably the vehicle, but additionally or alternatively the user device and/or any other suitable device), outputting one or more beacons (e.g., radio beacon, such as Bluetooth or Wi-Fi; audio beacon, such as ultrasonic; optical beacon, such as IR; etc.); at a second device (preferably the user device, but additionally or alternatively the vehicle and/or any other suitable device), detecting one or more of the beacons; at the second device, determining the relative position based on the detected beacon(s) (e.g., based on beacon intensity, signal strength, angle of arrival, etc.); and optionally, communicating information associated with the relative position (e.g., transmit to the remote computing system; and/or if the second device is not the user device, transmit to the user device, such as transmit directly from the vehicle to the user device and/or transmit via the remote computing system; etc.). Based on the relative position (e.g., in response to determining the relative position), the direction (e.g., heading) and/or distance to the vehicle can be provided to the user (e.g., as described above regarding providing information determined based on geospatial position information). In some embodiments, information determined (e.g., using data fusion techniques) based on both the relative position data and geospatial position data is provided. In some embodiments, a vehicle image (and/or associated image information) can be presented to the user. The vehicle image can be the most recent image associated with the vehicle, or be any other suitable image associated with the vehicle. The most recent image can be the image having a recordation timestamp with the smallest difference to the current time (e.g., timestamp closest to an instantaneous time), or be otherwise determined. The vehicle image can be sampled by a prior user (e.g., the last rider, the last user), sampled by the vehicle, another user (e.g., a community member), another vehicle (e.g., another vehicle managed by the management entity, a vehicle managed by a third party, etc.), or otherwise obtained. In a first example, the geospatial position data can be refined based on the relative position data (e.g., if available), wherein the refined information can presented to the user. In a second example, the user can be navigated to a location within a predetermined distance of the vehicle (e.g., within 8 meters, 74 meters, boo meters, etc.) using the geospatial position information. After the user is within the predetermined distance of the vehicle, the method can automatically switch to navigating the user to the vehicle using the relative position data. In alternate embodiments, information determined based only on the relative position data is provided (e.g., when no geospatial position data is available, when geospatial position data quality is poor, etc.). The information can be determined and/or provided in response to determination that the user is looking for and/or near (e.g., within detection and/or connection range of) the vehicle, receipt of a user request for assistance locating the vehicle (e.g., location information refinement request), and/or at any other suitable time.

However, providing location information S210 can additionally or alternatively include providing any other suitable information.

Providing environmental information S220 preferably functions to provide contextual information about the vehicle's surroundings. The environmental information can include environmental information determined as described above (e.g., regarding S100) and/or any other suitable environmental information. S220 can include providing sensor information sampled at the vehicle (e.g., images and/or videos sampled by one or more vehicle cameras), such as by displaying the sensor information at the user device. S220 can additionally or alternatively include providing information determined based on the sensor information, such as a local map (e.g., map of objects near the vehicle). The environmental information can be provided in response to determination of the environmental information (and/or receipt of the information at another device, such as the user device and/or remote computing system), determination that the user is looking for and/or near the vehicle, receipt of a user request for assistance locating the vehicle, and/or at any other suitable time. However, S220 can additionally or alternatively include providing any other suitable environmental information in any suitable manner.

In one variation, providing environmental information can include presenting images on the client application. The vehicle images can be presented for one or more vehicles. The vehicle images can be presented: before vehicle reservation, after vehicle reservation (e.g., to guide the user to the reserved vehicle), or at any suitable time. The display of the images can be in association with a vehicle location, in a grid or on a map, in association with a vehicle icon. The images can be presented: when a user taps, clicks, commands (e.g., via verbal commands) a vehicle icon, or otherwise instructs the client application to display the images associated with the vehicle; the images could always be shown; and/or the images can be otherwise presented.

The vehicles that are presented to the user can be limited or unlimited. The vehicles presented to the user can be limited to: available vehicles (e.g., accessible vehicles, unreserved vehicles, vehicles not currently in an active riding session, etc.), unavailable vehicles, and/or otherwise limited. For example, the number of images a user can view can be limited (e.g., 5 vehicles per hour, 10 vehicles per hour, etc.). In another example, the selection of available vehicles can be limited by walking time 570 to a given vehicle (e.g., 5 minutes, 10 minutes, etc.). In another example, selection of available vehicles can be limited by image expiration. In a specific example, the image associated with a vehicle could be removed from (or precluded from presentation on) the client application after a period of time (e.g. 3 hours, 5 hours, etc.) wherein the period of time can be an threshold amount of time that the surrounding landmarks are considered relevant (e.g., a car parked near a vehicle could have moved more than a predetermined amount, such as 10 feet, after the threshold amount of time). In another example, the image associated with a vehicle could be removed from the client application when the vehicle has moved more than a predetermined distance (e.g., 10 feet, 5 wheel rotations, etc.). In another example, the available vehicles presented to the user can be limited by the geo location of the user. In a specific example, the client application can present images within a predetermined radius from the user. In another example, the available vehicles presented to the vehicle can be limited by serving the most recent image. In another example, the images will be presented on the client application until a vehicle is reserved, at which point, the images will no longer be served on the client application. However, the selection of available vehicles can be limited by any other suitable method.

In one variation, the image captured by a prior user's device (e.g., the image associated with the most recent timestamp) can be displayed with the image captured by the vehicle on the client application. However, the presented vehicle images can include: only images be captured by other users, only images captured by the vehicle, or any other suitable set of images.

Providing outputs at the vehicle S230 preferably functions to increase the conspicuousness of the vehicle (e.g., facilitating direct sensory location of the vehicle by the user). The outputs can include audio outputs (e.g., beeps, chimes, whistles, sirens, spoken words, etc.), visual outputs (e.g., light outputs such as constant, blinking, and/or strobing outputs), movement outputs (e.g., actuating one or more motion devices of the vehicle, such as controlling the vehicle to drive), and/or any other suitable outputs. The outputs can be provided in response to determination that the user is looking for and/or near the vehicle, receipt of a user request for assistance locating the vehicle (e.g., request for a vehicle output), and/or at any other suitable time. However, S230 can additionally or alternatively include providing any other suitable outputs in any suitable manner.

Facilitating location of the vehicle S200 can optionally include communicating information determined in S200 (e.g., telemetry data, such as telemetry data sampled at the user device, vehicle, and/or any other suitable devices). Such information can include information determined and/or provided (e.g., to the user) during the search, user actions (e.g., user and/or user device movements), search results (e.g., success or failure to locate the vehicle; location at which the vehicle is located; success or failure to access the vehicle following vehicle location, such as due to vehicle placement in a publicly-inaccessible region; etc.), and/or any other suitable information. The information is preferably communicated to the remote computing system (e.g., by the vehicle, user device, etc.) but can additionally or alternatively be communicated to any other suitable device(s). The information can be used for refinement of future performances of the method (e.g., used as training data for a machine learning technique), used in S100 (e.g., as described above), and/or used in any other suitable manner. However, S200 can additionally or alternatively include any other suitable elements performed in any suitable manner.

3.3 Controlling Vehicle Management.

Controlling vehicle management S300, which preferably functions to enable use of accessibility information (e.g., determined in S100 and/or S200). S300 is preferably performed in response to determination that a vehicle is (or may be) inaccessible.

S300 preferably includes disabling and/or altering some or all user interactions associated with the inaccessible vehicle. For example, in a user interface associated with the vehicle (e.g., associated with a fleet of vehicles that the user may operate), the inaccessible vehicle can be treated differently than other (e.g., accessible) vehicles. The inaccessible vehicle can be displayed differently (e.g., different color or appearance, such as in a list or map of vehicles) and/or displayed in association with a warning (e.g., warning regarding potential inaccessibility of the vehicle. Additionally or alternatively, vehicle reservations can be disabled for the inaccessible vehicle (e.g., in all cases, if the user is farther from the inaccessible vehicle than a threshold distance, if there are not other available vehicles near the inaccessible vehicle, etc.), which can prevent user frustration associated with trying to locate and/or access an inaccessible vehicle. Additionally or alternatively, if the vehicle is reserved, a notification can be sent to the user. Additionally or alternatively, any other suitable vehicle and/or user interface interactions (e.g., vehicle operation, request for walking directions to the vehicle, etc.) associated with the inaccessible vehicle can be disabled, and/or user interactions with the inaccessible vehicle can be altered in any other suitable manner.

S300 can additionally or alternatively include communicating the inaccessible state of the vehicle to a vehicle management service, such as by displaying an indication of the inaccessible state in a vehicle status dashboard and/or sending a notification to the vehicle management service.

S300 can additionally or alternatively include interacting with one or more people who may have access to the inaccessible vehicle (e.g., resident of a residence in which the vehicle is currently located, previous user of the vehicle, etc.). Such interactions can include contacting one or more previous users of the vehicle (e.g., most recent user), such as via contact information (e.g., email, phone, mailing address, etc.) associated with the user's account, preferably to request that the user return the vehicle to an accessible location (e.g., sidewalk and/or other typical vehicle parking location). Such interactions can additionally or alternatively include providing outputs at the vehicle (e.g., sound, light, vibration, vehicle motion, etc; such as described above regarding S230 and/or otherwise). In a first example, the outputs include a spoken request to return the vehicle to an accessible location. In a second example, the outputs include activating a loud siren (e.g., klaxon) and/or intense visual output (e.g., bright strobe light). In a third example, the loud siren and/or intense visual output are provided only after failure to elicit a favorable response to the spoken request. However, the interactions can additionally or alternatively include any other suitable interactions with any suitable entities, and/or S300 can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for locating a vehicle, comprising:
   receiving images for each of a set of vehicles, each image capturing a scene proximal the respective vehicle;
   for each vehicle of the set of vehicles, classifying a location of the vehicle as indoors or outdoors based on the respective image;
   on a user device, presenting a set of available vehicles located within a predetermined distance from the user device, wherein the set of available vehicles is determined from the set of vehicles and excludes vehicles with a location classified as indoors; and
   when a vehicle is selected from the set of available vehicles, facilitating location of the vehicle, comprising presenting the image for the vehicle on the user device.

2. The method of claim 1, further comprising, prior to presenting the image:
   detecting sensitive content within the image; and
   obscuring the detected sensitive content.

3. The method of claim 1, wherein the images are captured by secondary user devices previously associated with a riding session for each of the respective vehicles.

4. The method of claim 1, wherein facilitating location of the vehicle further comprises:
   directing a user to an imprecise location for the vehicle, wherein the imprecise location is determined using GPS information sampled by the vehicle; and
   after directing the user to the imprecise location, directing the user to a refined location of the vehicle, wherein the refined location is determined by short range wireless communication between the user device and the vehicle.

5. A method for locating a vehicle, comprising:
   determining vehicle information for a vehicle;
   classifying a vehicle location for the vehicle as indoors or outdoors, based on the vehicle information;
   when the vehicle location is classified as indoors, not serving the vehicle information on a client application; and
   when the vehicle location is classified as outdoors:
      selectively serving the vehicle information on the client application; and
      facilitating location of the vehicle.

6. The method of claim 5, wherein the vehicle location is classified as indoors based on a temperature reading sampled by a set of sensors mounted to the vehicle, wherein the vehicle location is classified as indoors when the temperature reading is outside of a predetermined temperature range.

7. The method of claim 5, wherein the vehicle location is classified as indoors based on ambient light sampled by a set of sensors mounted to the vehicle, wherein the vehicle location is classified as indoors when the ambient light falls below a threshold illuminance level for a given time of day.

8. The method of claim 5, wherein the vehicle information comprises an image associated with the vehicle, and wherein facilitating location of the vehicle comprises presenting the image on the client application.

9. The method of claim 8, wherein the image is captured by a visual sensor mounted to the vehicle, wherein the image is captured a predetermined period after a ride session for the vehicle.

10. The method of claim 8,
    wherein the image is received from a second instance of the client application;
    wherein receipt of the image terminates a ride session for the vehicle and associated with the second instance of the client application; and
    wherein the image contains the vehicle.

11. The method of claim 8, wherein classifying the vehicle location as indoors or outdoors comprises classifying the image with a non-parametric classifier.

12. The method of claim 8, wherein a remote computing system, remote from the vehicle and the client application, receives the image, classifies the vehicle location, and selectively serves the vehicle information on the client application.

13. The method of claim 8, wherein selectively serving the vehicle information on the client application comprises not serving the image after the vehicle has been moved.

14. The method of claim 5, wherein selectively serving the vehicle information on the client application comprises presenting a most recent image associated with the vehicle on the client application.

15. The method of claim 5, further comprising, when the vehicle location is classified as outdoors:
    detecting sensitive content within the image; and
    removing the sensitive content from the image.

16. The method of claim 15, wherein the sensitive content is detected using an object detector.

17. The method of claim 5, further comprising, when the vehicle location is classified as indoors:
    not serving the vehicle information on the client application; and
    controlling the vehicle to generate an output.

18. The method of claim 5, wherein facilitating location of the vehicle comprises:
    determining a geospatial position of a user device executing the client application;
    determining an imprecise geospatial position of the vehicle, wherein the imprecise geospatial position is at least a predetermined distance from the vehicle;
    determining a route from the geospatial position of the user device to the imprecise geospatial position of the vehicle;
    presenting the route on the client application, wherein the route is overlaid on a map; and
    when the user device is within the predetermined distance from the vehicle, locally routing a user to the vehicle.

19. The method of claim 18, wherein locally routing the user to the vehicle comprises selectively serving the vehicle information on the client application, wherein the vehicle information comprises an image associated with the vehicle.

20. The method of claim 18, wherein locally routing the user to the vehicle comprises:
    detecting a wireless network broadcast by the vehicle at the client application; and
    routing the user to the vehicle based on the wireless network.

* * * * *